(12) United States Patent
Anzai

(10) Patent No.: US 11,271,757 B2
(45) Date of Patent: Mar. 8, 2022

(54) MONITORING DEVICE, MONITORING SYSTEM, INFORMATION PROCESSING DEVICE, MONITORING METHOD, AND PROGRAM

(71) Applicant: MITSUBISHI HEAVY INDUSTRIES, LTD., Tokyo (JP)

(72) Inventor: Fumikado Anzai, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 403 days.

(21) Appl. No.: 16/229,580

(22) Filed: Dec. 21, 2018

(65) Prior Publication Data

US 2019/0207774 A1 Jul. 4, 2019

(30) Foreign Application Priority Data

Dec. 28, 2017 (JP) .............................. JP2017-254839

(51) Int. Cl.
*H04L 29/06* (2006.01)
*H04L 9/32* (2006.01)
(Continued)

(52) U.S. Cl.
CPC ............ *H04L 9/3278* (2013.01); *G06F 21/44* (2013.01); *G06F 21/445* (2013.01); *G06F 21/73* (2013.01); *G06F 21/76* (2013.01); *G09C 1/00* (2013.01); *H04L 9/0877* (2013.01); *H04L 2209/12* (2013.01)

(58) Field of Classification Search
None
See application file for complete search history.

(56) References Cited

U.S. PATENT DOCUMENTS 9,032,476 B2 * 5/2015 Potkonjak ............... G06F 21/34
726/2
9,367,701 B2 * 6/2016 Merchan ............... H04L 9/0866
(Continued)

FOREIGN PATENT DOCUMENTS

| CN | 102812472 | 12/2012 |
|---|---|---|
| JP | 2010-182070 | 8/2010 |

(Continued)

*Primary Examiner* — Maung T Lwin
(74) *Attorney, Agent, or Firm* — Wenderoth, Lind & Ponack, L.L.P.

(57) ABSTRACT

A monitoring device is configured to monitor a monitoring target device. The monitoring device includes a circuit information distribution program configured to distribute circuit information for programming a physically unclonable function (PUF) circuit to the monitoring target device; a transmission processing program configured to transmit a challenge value to the monitoring target device to which circuit information is distributed; a reception processing program configured to receive a response value corresponding to the challenge value of the PUF circuit programmed in the monitoring target device; and an authentication processing program configured to authenticate the monitoring target device based on input and output correspondence information of the PUF circuit programmed in the monitoring target device and the response value which has been received.

11 Claims, 15 Drawing Sheets

(51) Int. Cl.
  *G06F 21/44* (2013.01)
  *G06F 21/73* (2013.01)
  *G09C 1/00* (2006.01)
  *H04L 9/08* (2006.01)
  *G06F 21/76* (2013.01)

(56) References Cited

U.S. PATENT DOCUMENTS

| | | | | |
|---|---|---|---|---|
| 9,715,590 | B2* | 7/2017 | Gardner | H04L 9/3221 |
| 2010/0272255 | A1 | 10/2010 | Devadas et al. | |
| 2013/0019105 | A1* | 1/2013 | Hussain | G06F 21/10 |
| | | | | 713/189 |
| 2013/0047209 | A1 | 2/2013 | Satoh et al. | |
| 2013/0298211 | A1* | 11/2013 | M'Raihi | H04L 63/08 |
| | | | | 726/7 |
| 2014/0093074 | A1* | 4/2014 | Gotze | H04L 9/3278 |
| | | | | 380/45 |
| 2014/0189365 | A1* | 7/2014 | Cox | H04L 9/0866 |
| | | | | 713/189 |
| 2014/0325237 | A1* | 10/2014 | Van Der Leest | H04L 9/0866 |
| | | | | 713/189 |
| 2015/0012737 | A1* | 1/2015 | Newell | G06F 21/575 |
| | | | | 713/2 |
| 2015/0312041 | A1* | 10/2015 | Choi | H04L 63/0823 |
| | | | | 713/175 |
| 2016/0127346 | A1* | 5/2016 | Bares | H04L 63/0853 |
| | | | | 713/172 |
| 2016/0170907 | A1* | 6/2016 | Walsh | G06F 21/44 |
| | | | | 713/193 |
| 2017/0310489 | A1 | 10/2017 | Van Der Sluis et al. | |
| 2018/0097639 | A1* | 4/2018 | Gulati | G06F 8/61 |

FOREIGN PATENT DOCUMENTS

| | | |
|---|---|---|
| JP | 2011-198317 | 10/2011 |
| JP | 2013-046334 | 3/2013 |
| JP | 5499358 | 5/2014 |
| JP | 5574627 | 8/2014 |
| JP | 2014-229968 | 12/2014 |
| JP | 2015-036257 | 2/2015 |
| JP | 2015-171799 | 10/2015 |
| JP | 2016-162431 | 9/2016 |
| JP | 2017-084232 | 5/2017 |
| JP | 2017-098998 | 6/2017 |
| JP | 2017-531411 | 10/2017 |
| JP | 2017-204707 | 11/2017 |
| JP | 2018-142078 | 9/2018 |

* cited by examiner

FIG. 9

<CRP INFORMATION> B11

| DEVICE ID:X1 ||
|---|---|
| PUF CIRCUIT ID: α1 ||
| CHALLENGE VALUE | RESPONSE VALUE |
| 01011010··· | 10010111··· |
| 11001000··· | 11000101··· |
| 10111001··· | 01100010··· |
| ··· | ··· |

<CRP INFORMATION>

| DEVICE ID:X1 | | | |
|---|---|---|---|
| PUF CIRCUIT ID: α1 | | PUF CIRCUIT ID: α2 | |
| CHALLENGE VALUE | RESPONSE VALUE | CHALLENGE VALUE | RESPONSE VALUE |
| 01011010··· | 10010111··· | 01011010··· | 00100100··· |
| 11001000··· | 11000101··· | 11001000··· | 11100111··· |
| 10111001··· | 01100010··· | 10111001··· | 10111101··· |
| ··· | ··· | ··· | ··· |

US 11,271,757 B2

MONITORING DEVICE, MONITORING SYSTEM, INFORMATION PROCESSING DEVICE, MONITORING METHOD, AND PROGRAM

CROSS-REFERENCE TO RELATED APPLICATION

Priority is claimed from Japanese Patent Application No. 2017-254839, filed Dec. 28, 2017, the content of which is incorporated herein by reference.

TECHNICAL FIELD

The present disclosure relates to a monitoring device, a monitoring system, an information processing device, a monitoring method and a program.

BACKGROUND ART

As a method of protecting embedded software, methods of protection by encryption using a trusted platform module (TPM) and removing software by detecting an environmental change have been proposed. In addition, a method in which a physical quantity such as a manufacturing variation and a difference in physical characteristics of a semiconductor chip called a physically unclonable function (PUF) is output as an eigenvalue of the semiconductor chip and is used for a security function of electronic device hardware such as an authenticity determination and authentication process, an encryption process, and the like of a semiconductor chip and devices on which the semiconductor chip is mounted has been proposed (for example, refer Japanese Patent No. 5499358).

SUMMARY

As one aspect of a physically unclonable function (hereinafter also referred to as a "PUF"), an arbiter PUF, a glitch PUF and the like in which a predetermined circuit (hereinafter also referred to as a "PUF circuit") is formed (programmed) in a field-programmable gate array (FPGA) and a signal delay difference unique to the PUF circuit is used are known.

In order to use an arbiter PUF and a glitch PUF for improving a hardware security function, it is necessary to acquire and record in advance input and output correspondence information (challenge response pair; CRP) unique to the PUF circuit before shipment of a product. In this case, in consideration of a possibility of input and output correspondence information recorded in advance being illegally tampered with, concerns arise for improving a hardware security function using a PUF.

An object of the present invention is to provide a monitoring device, a monitoring system, an information processing device, a monitoring method and a program through which it is possible to improve a hardware security function using a PUF.

According to a first aspect of the present invention, there is provided a monitoring device that is one of a plurality of nodes constituting a distributed ledger system and is configured to monitor a predetermined monitoring target device, the monitoring device including:

a circuit information distribution unit configured to distribute circuit information for forming a predetermined PUF circuit to the monitoring target device, which is information registered in advance in the distributed ledger system;

a transmission processing unit configured to transmit a predetermined challenge value to the monitoring target device to which the circuit information is distributed, a reception processing unit configured to receive a response value corresponding to the challenge value of the PUF circuit formed in the monitoring target device; and an authentication processing unit configured to authenticate the monitoring target device based on input and output correspondence information of the PUF circuit formed in the monitoring target device, which is information registered in advance in the distributed ledger system, and the received response value.

In addition, according to a second aspect of the present invention, the authentication processing unit is further configured to perform authentication of the monitoring target device based on a result of an agreement building process performed by a plurality of other nodes constituting the distributed ledger system.

In addition, according to a third aspect of the present invention, when a hash value inquiry of the distributed circuit information is received from the monitoring target device, the circuit information distribution unit is configured to transmit a hash value of the circuit information registered in advance in the distributed ledger system.

In addition, according to a fourth aspect of the present invention, the monitoring device further includes an input and output correspondence information registration unit configured to transmit a plurality of types of challenge values to the monitoring target device, receive response values corresponding to the challenge values from the monitoring target device, create input and output correspondence information of the PUF circuit formed in the monitoring target device, and register the created information in the distributed ledger system.

In addition, according to a fifth aspect of the present invention, the monitoring device further includes a mutual authentication unit configured to perform mutual authentication with the monitoring target device based on a common key registered in advance.

In addition, according to a sixth aspect of the present invention, there is provided a monitoring system including a plurality of monitoring devices according to any one of the first to fifth aspects, wherein the plurality of monitoring devices are communicatively connected to each other and constitute the distributed ledger system.

In addition, according to a seventh aspect of the present invention, there is provided an information processing device including a circuit forming unit configured to, when a PUF circuit is not formed, request circuit information to a monitoring device, and form the PUF circuit based on the circuit information received from the monitoring device; and a device authentication request unit configured to, when the PUF circuit is formed, request the monitoring device to perform authentication, wherein the device authentication request unit is configured to input a challenge value received from the monitoring device into the PUF circuit in response to the authentication request, and reply with a response value, which is an output result of the PUF circuit to the monitoring device.

In addition, according to an eighth aspect of the present invention, the information processing device further includes a decrypting processing unit configured to decrypt a control program encrypted in advance when authentication with the monitoring device is successful as a result of the authentication request.

In addition, according to a ninth aspect of the present invention, when authentication with the monitoring device is not successful as a result of the authentication request, the device authentication request unit is configured to remove the control program.

In addition, according to a tenth aspect of the present invention, there is provided a monitoring method in which a predetermined monitoring target device is monitored using a monitoring device that is one of a plurality of nodes constituting a distributed ledger system, the monitoring method including:

distributing circuit information for forming a PUF circuit to the monitoring target device, which is information registered in advance in the distributed ledger system;

transmitting a predetermined challenge value to the monitoring target device to which the circuit information is distributed;

receiving a response value corresponding to the challenge value of the PUF circuit formed in the monitoring target device; and authenticating the monitoring target device based on input and output correspondence information of the PUF circuit formed in the monitoring target device, which is information registered in advance in the distributed ledger system, and the received response value.

In addition, according to an eleventh aspect of the present invention, there is provided a non-transitory computer readable medium storing a program causing a monitoring device that is one of a plurality of nodes constituting a distributed ledger system and is configured to monitor a predetermined monitoring target device to perform:

distributing circuit information for forming a PUF circuit to the monitoring target device, which is information registered in advance in the distributed ledger system;

transmitting a predetermined challenge value to the monitoring target device to which the circuit information is distributed;

receiving a response value corresponding to the challenge value of the PUF circuit formed in the monitoring target device; and authenticating the monitoring target device based on input and output correspondence information of the PUF circuit formed in the monitoring target device, which is information registered in advance in the distributed ledger system, and the received response value.

According to the aspects of the invention described above, it is possible to increase the reliability of authenticity determination of a product using a PUF.

BRIEF DESCRIPTION OF DRAWINGS

FIG. 9 is a diagram showing a data structure of input and output correspondence information recorded in the monitoring device according to the first embodiment.

DESCRIPTION OF EMBODIMENTS

First Embodiment

A monitoring system and a monitoring target device according to a first embodiment will be described below with reference to FIG. 1 to FIG. 11B.

(Overall structure of monitoring system)

Figure 1:
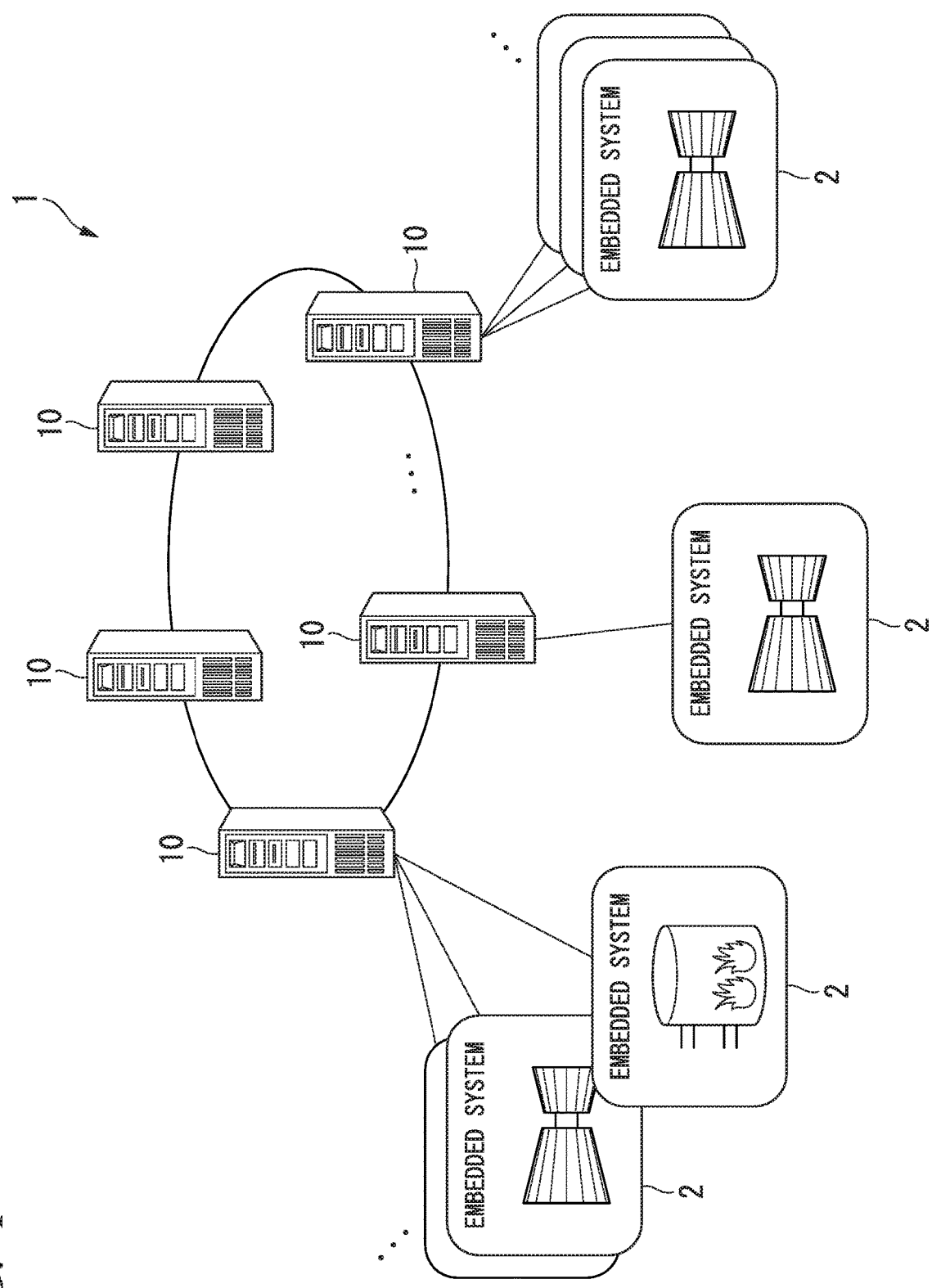
FIG. 1 is a diagram showing an overall structure of a monitoring system according to a first embodiment.

FIG. 1 is a diagram showing an overall structure of a monitoring system according to the first embodiment.

A monitoring system 1 shown in FIG. 1 is a system for monitoring various embedded systems 2. Specifically, the monitoring system 1 is communicatively connected to the embedded system 2 and authenticates (verifies validity) products (such as a logic solver and various IO devices to be described below) constituting the embedded system 2.

As shown in FIG. 1, a plurality of monitoring devices 10 are provided.

The plurality of monitoring devices 10 are communicatively connected to each other via a wide area network (for example, an Internet line, etc.). The plurality of monitoring devices 10 perform, for example, peer to peer (P2P) communication.

The monitoring system 1 constitutes a distributed ledger system, and the plurality of monitoring devices 10 function as nodes of the distributed ledger system. In the configuration of the distributed ledger system, the monitoring devices 10 as nodes independently maintain information groups stored in the monitoring system 1 and thus the information groups can be managed in a distributed manner. Specifically, the monitoring devices 10 store an information group of which registration is requested from the outside, and registers (records) the information group as a new block in the distributed ledger system through a predetermined agreement building algorithm. When a new block is registered by one node (the monitoring device 10), it is registered by all of the other nodes (the monitoring devices 10) in the same manner. The newly registered block includes information (hash value) uniquely identified according to content of a block registered previously. Therefore, it is possible to increase a resistance to tampering with respect to the registered information group.

The embedded system 2 is a monitoring target of the monitoring system 1.

The embedded system 2 according to the present embodiment is, for example, an embedded system that controls a gas turbine, a steam turbine, a boiler and the like installed in a power plant or the like as targets.

The embedded system 2 is constructed by a combination of a plurality of products (for example, a logic solver, an IO device, etc.). Products constructing the embedded system 2 are sequentially added and updated according to an operation form of a control target (such as a gas turbine). If a newly added or updated product is a fraudulent article (imitation), the entire embedded system 2 is threatened. Therefore, the monitoring system 1 performs authentication (verification of validity) of a newly added or updated product in each embedded system 2.

Here, the embedded system 2 to which the monitoring system 1 is applied is not limited to a system that controls a gas turbine, a steam turbine, and a boiler as control targets, but may be a system that controls, for example, intelligent transport systems (ITS), a cold heat system (a large refrigerator and an air conditioner), or a vehicle (a railway vehicle, an automobile, a construction machine, etc.) as a target.

(Configuration of monitoring system and embedded system)

Figure 2:
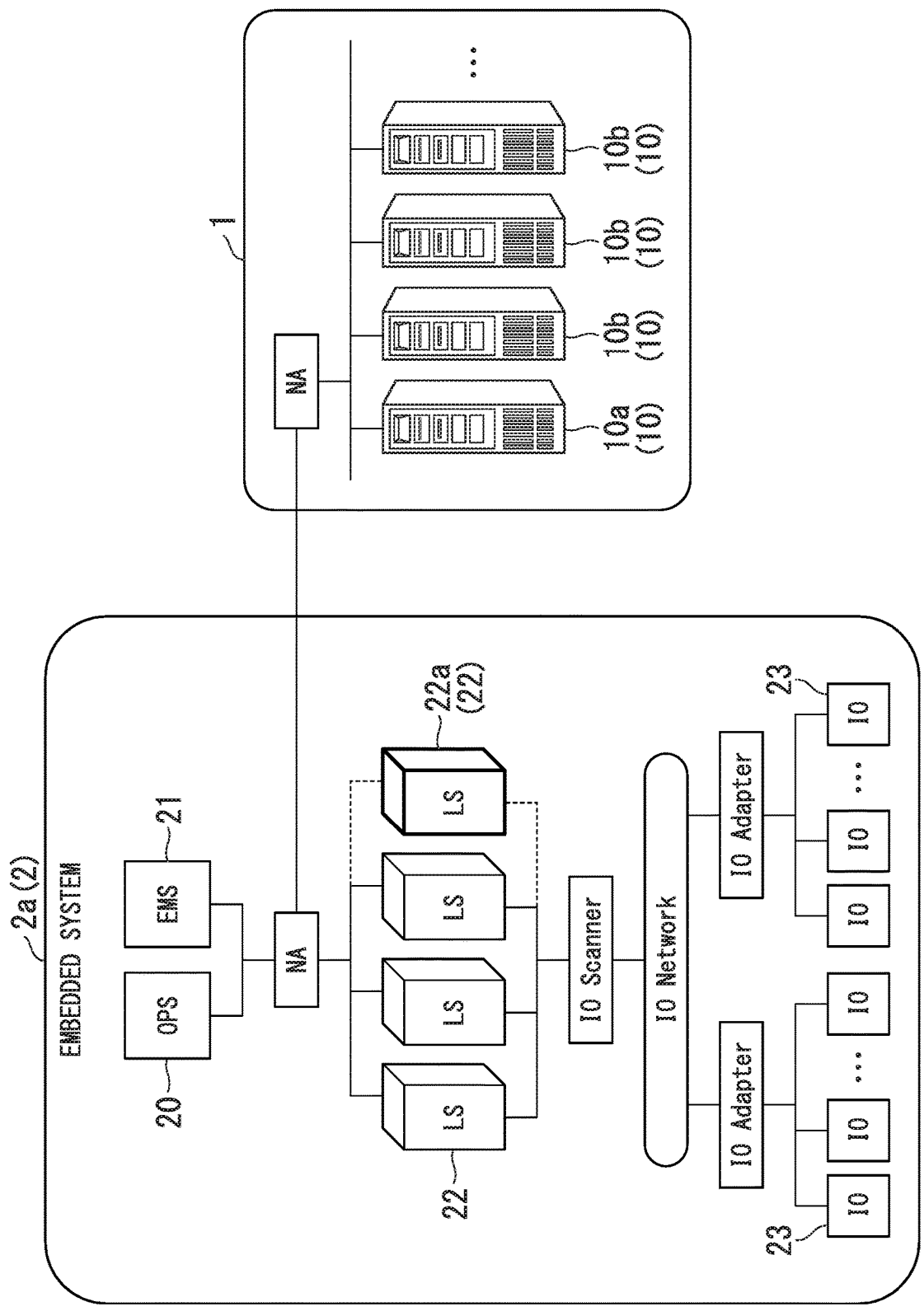
FIG. 2 is a diagram showing a configuration of a monitoring system and an embedded system according to the first embodiment.

FIG. 2 is a diagram showing a configuration of a monitoring system and an embedded system according to the first embodiment.

As shown in FIG. 2, the monitoring system 1 and the embedded system 2 are communicatively connected to each other via a network adapter (NA), which is a network relay device.

An embedded system 2a shown in FIG. 2 is one of a plurality of embedded systems 2 that are monitored by the monitoring system 1. The embedded system 2a is, for example, an embedded system that controls a gas turbine as a target.

A monitoring device 10a, which is one node within the monitoring system 1, is directly communicatively connected to the embedded system 2a and sets it as a monitoring target. In addition, another monitoring device 10b different from the monitoring device 10a does not directly set the embedded system 2a as a monitoring target, but is directly communicatively connected to another embedded system 2 (not shown) and sets it as a monitoring target.

As shown in FIG. 2, the embedded system 2 includes an operator station (OPS) 20, an engineering maintenance station (EMS) 21, a logic solver (LS) 22, and an IO device (IO) 23.

The OPS 20 is a device allowing an operator to ascertain a state of a control target device (gas turbine) and perform control (opening and closing control of a valve and the like).

The EMS 21 is a device for creating a control program and installing it in a control operation device (the logic solver 22 to be described below). The logic solver 22 is a core device that performs a control operation of a gas turbine. The logic solver 22 controls a valve, an input and output of a sensor or the like, and a state according to the control program. As shown in FIG. 2, a plurality of LSs 22 are connected in parallel in a redundant manner.

The IO device 23 is an IO device (various sensors, actuators, etc.) attached to a gas turbine. The plurality of IO devices 23 are connected to the logic solver 22 through an IO scanner, an IO network, and an IO adapter. Here, the IO scanner is a communication relay device for connecting the IO network and the logic solver 22, and the IO adapter is a communication relay device of the IO network.

The logic solver 22 and the IO device 23 according to the present embodiment are one form of an information processing device that operates according to a predetermined control program.

A flow of processes when a logic solver 22a is newly added to the embedded system 2a will be described below. Here, the newly added logic solver 22a will be referred to as a monitoring target device 22a in the following description.

(Functional configuration of monitoring device)

Figure 3:
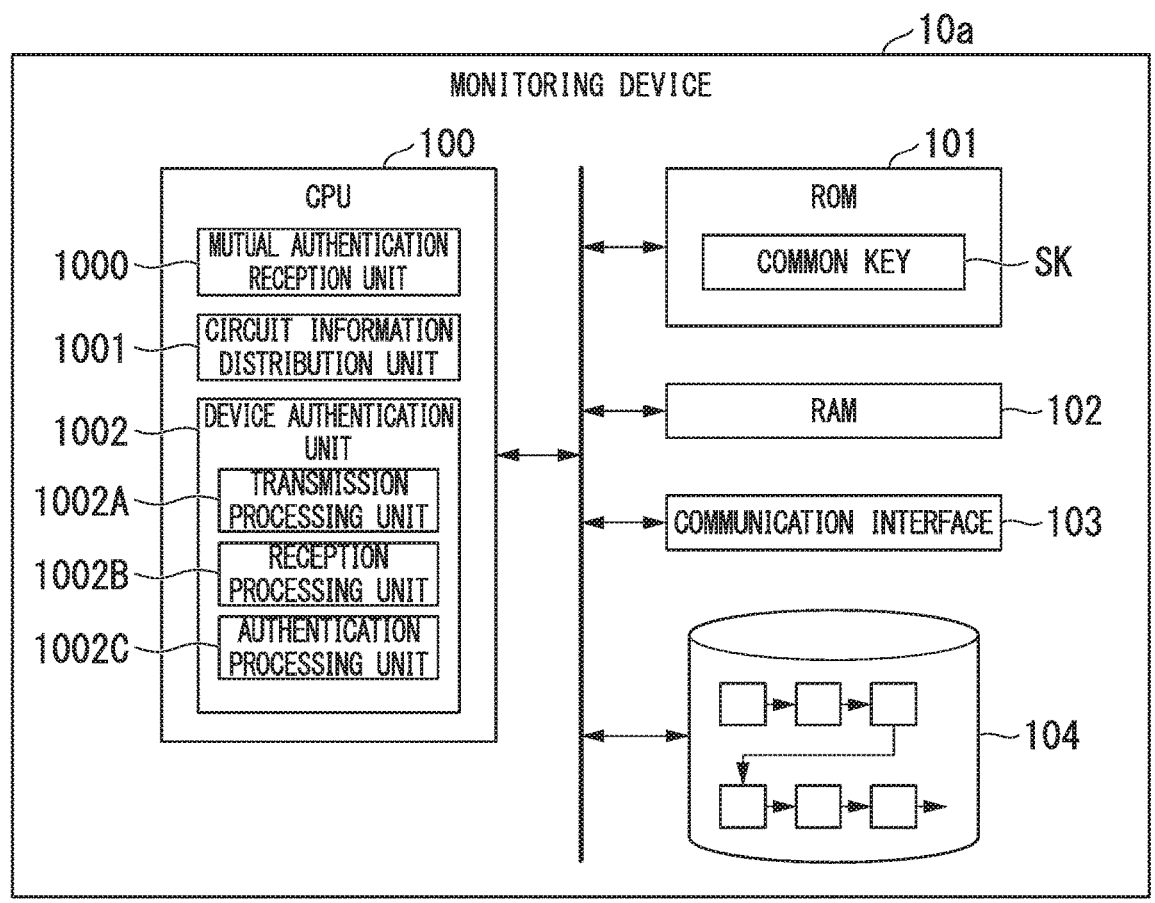
FIG. 3 is a diagram showing a functional configuration of a monitoring device according to the first embodiment.

FIG. 3 is a diagram showing a functional configuration of a monitoring device according to the first embodiment.

Here, the configuration of the monitoring device 10a shown in FIG. 3 is the same as in another monitoring device 10b constituting the monitoring system 1.

As shown in FIG. 3, the monitoring device 10a includes a CPU 100, a ROM 101, a RAM 102, a communication interface 103, and a recording medium 104.

The CPU 100 is a processor that controls all operations of the monitoring device 10a. The CPU 100 operates according to a program prepared in advance and exhibits various functions to be described below. The ROM 101 is a non-rewritable nonvolatile memory. In the ROM 101 according to the present embodiment, a common key SK for realizing a common key encryption method is recorded in advance.

The RAM 102 is a rewritable volatile memory. The RAM 102 is also referred to as a main storage device, and a program allowing the CPU 100 to perform various functions and operate is loaded thereinto.

The communication interface 103 is an interface for communication with another monitoring device 10a and a monitoring target embedded system 2 via a wide area network. In the present embodiment, a communication form (wired or wireless communication, a global network, a local network, etc.) of the communication interface 103 is not particularly limited.

The recording medium 104 is a mass storage device (nonvolatile memory) incorporated in the monitoring device 10a and is, for example, a hard disk drive (HDD), a solid state drive (SSD), or the like. The recording medium 104 is also referred to as an auxiliary storage device, and a database (hereinafter referred to as a "distributed ledger") of a distributed ledger system constituted by the monitoring system 1 is recorded therein.

When the CPU 100 operates according to a predetermined program, it exhibits functions as a mutual authentication reception unit 1000, a circuit information distribution unit 1001, and a device authentication unit 1002.

The mutual authentication reception unit 1000 receives a mutual authentication process from the monitoring target device 22a that is newly added to the embedded system 2. The "mutual authentication process" will be described below.

The circuit information distribution unit 1001 distributes circuit information to the monitoring target device 22a that is newly added to the embedded system 2. "Circuit information" is information for forming (programming) a predetermined physically unclonable function (PUF) circuit and a predetermined encryption key generation circuit in an FPGA (to be described below) of the monitoring target device 22a. Circuit information (and its hash value) is registered in advance in a distributed ledger of the distributed ledger system constituted by the monitoring system 1.

The device authentication unit 1002 performs an authentication (verification of validity) process on the monitoring target device 22a to which the circuit information distribution unit 1001 has distributed circuit information. The authentication process is performed based on functions as a transmission processing unit 1002A, a reception processing unit 1002B, and an authentication processing unit 1002C of the device authentication unit 1002.

The transmission processing unit 1002A transmits a predetermined challenge value to the monitoring target device 22a to which the circuit information distribution unit 1001 distributes circuit information via a wide area network. A "challenge value" is an input value for obtaining a corresponding output value (response value) from the PUF circuit and is mainly a random number.

The reception processing unit 1002B receives a response value corresponding to a challenge value from the monitoring target device 22a that has transmitted the challenge value via a wide area network. The "response value" is an output value that is uniquely output from a PUF circuit in response to a challenge value when a predetermined challenge value is input to the PUF circuit formed in the monitoring target device 22a.

The authentication processing unit 1002C authenticates the monitoring target device 22a based on input and output correspondence information (referred to as a challenge response pair (CRP)) of the PUF circuit formed in the monitoring target device 22a and the response value received from the monitoring target device 22a. The "CRP" is information indicating a correspondence relationship between an input value (challenge value) and an output value (response value) of the PUF circuit, and is an information table in which a plurality of pairs of a challenge value and a response value are recorded for each product (the monitoring target device 22a) and for each PUF circuit. Since a response value output to correspond to a challenge value is determined depending on individual physical differences such as a difference in signal delay occurring in the PUF circuit, even if the logical circuit configuration of the PUF circuit is the same, when the product (the monitoring target device 22a) is different, it is not possible to output the same response value in response to the same challenge value. Therefore, when the response value acquired in advance as a CRP is the same as the response value received via a wide area network, the authentication processing unit 1002C can determine that a destination device which a challenge value is transmitted is authentic (the monitoring target device 22a to be newly added to the embedded system 2).

Here, a CRP for the PUF circuit of the monitoring target device 22a is measured in advance before shipment of the monitoring target device 22a and is registered in a distributed ledger of the distributed ledger system constituted by the monitoring system 1.

(Functional configuration of monitoring target device)

Figure 4:
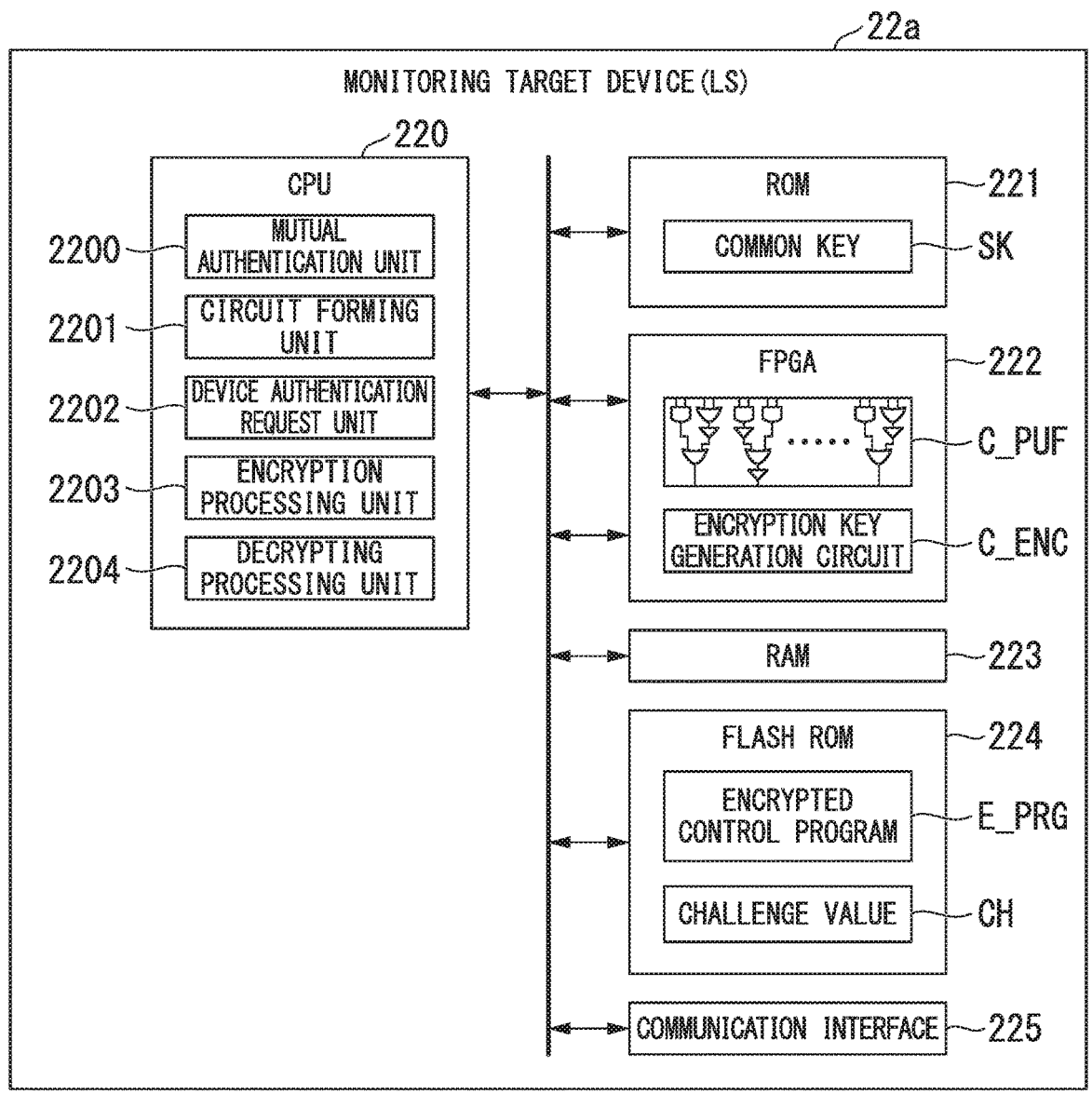
FIG. 4 is a diagram showing a functional configuration of a monitoring target device according to the first embodiment.

FIG. 4 is a diagram showing a functional configuration of a monitoring target device according to the first embodiment.

Here, the configuration of the monitoring target device 22a shown in FIG. 4 is the same as that of other monitoring target devices (the LS 22, the IO device 23, etc.) constituting another embedded system 2.

As shown in FIG. 4, the monitoring target device 22a includes a CPU 220, a ROM 221, an FPGA 222, a RAM 223, a flash ROM 224, and a communication interface 225.

The CPU 220 is a processor that controls all operations of the monitoring target device 22a. The CPU 220 operates according to a program prepared in advance and exhibits various functions to be described below. In addition, after authentication is performed by the monitoring device 10a, the CPU 220 operates according to a predetermined control program, and is thus formally operated as one constituent device of the embedded system 2 that controls a gas turbine or the like.

The ROM 221 is a non-rewritable nonvolatile memory. In the ROM 221 according to the present embodiment, a common key SK for realizing a common key encryption method is recorded in advance. The common key SK is the same as one recorded in the ROM 101 of the monitoring device 10a. In addition, although not shown in FIG. 4, in the ROM 221, a boot program for performing authentication with the monitoring device 10a during initial activation or the like is recorded.

The FPGA 222 is an integrated circuit that can form a desired logic circuit after manufacture. In the FPGA 222, a PUF circuit C_PUF and an encryption key generation circuit C_ENC based on circuit information received from the monitoring device 10a (the circuit information distribution unit 1001) are formed. Here, at the beginning of shipment of the monitoring target device 22a, a PUF circuit C_PUF and an encryption key generation circuit C_ENC are not formed in the FPGA 222.

The RAM 223 is a rewritable volatile memory. A program allowing the CPU 220 to exhibit various functions and operate is loaded into the RAM 223.

The flash ROM 224 is a rewritable nonvolatile memory. In the flash ROM 224, an encrypted control program (encrypted control program E_PRG) and a predetermined challenge value CH are recorded. Here, at the beginning of shipment of the monitoring target device 22a, no information is recorded in the flash ROM 224.

The communication interface 225 is an interface for communication with the monitoring device 10a and the like via a wide area network.

The CPU 220 operates according to a boot program recorded in the ROM 221, and thus exhibits functions as a mutual authentication unit 2200, a circuit forming unit 2201, a device authentication request unit 2202, an encryption processing unit 2203, and a decrypting processing unit 2204.

The mutual authentication unit 2200 performs a mutual authentication process with the monitoring device 10a during initial activation. In the mutual authentication process, authentication is performed using a mutual common key SK.

The circuit forming unit 2201 forms a PUF circuit C_PUF and an encryption key generation circuit C_ENC in the FPGA 222 based on circuit information received from the monitoring device 10a. Here, the encryption key generation circuit C_ENC may be a circuit based on a generally well-known common key encryption algorithm (for example, advanced encryption standard; AES).

After the circuit forming unit 2201 forms a PUF circuit C_PUF in the FPGA 222, the device authentication request unit 2202 requests the monitoring device 10a to perform formal authentication using the PUF circuit C_PUF.

After formal authentication by the monitoring device 10a is completed, the encryption processing unit 2203 encrypts a control program for formally operating as one constituent device of the embedded system 2, and records the encrypted control program E_PRG in the flash ROM 224 of the monitoring target device.

The decrypting processing unit 2204 decrypts the encrypted control program E_PRG recorded in the flash ROM 224 of the monitoring target device and loads it into the RAM 223. Thereby, the CPU 100 operates formally as a constituent device of the embedded system 2.

(Processing flow of mutual authentication phase)

Figure 5:
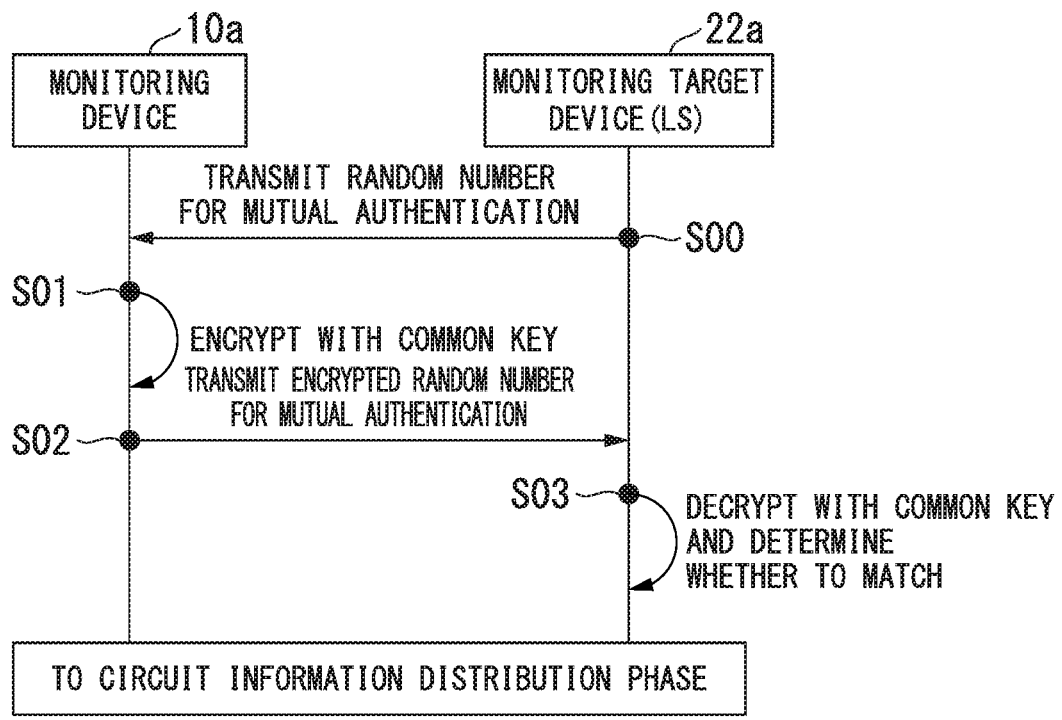
FIG. 5 is a diagram showing a processing flow of a mutual authentication phase executed between the monitoring device and the monitoring target device according to the first embodiment.

FIG. 5 is a diagram showing a processing flow of a mutual authentication phase executed between the monitoring device and the monitoring target device according to the first embodiment.

The processing flow of a mutual authentication phase shown in FIG. 5 starts from a stage in which the monitoring target device 22a connected to a network of the embedded system 2 is first activated. As an assumption, the monitoring target device 22a starts the mutual authentication phase shown in FIG. 5 triggered by the fact that a PUF circuit C_PUF and an encryption key generation circuit C_ENC are not installed (formed) in the FPGA 222 of the monitoring target device.

First, the activated monitoring target device 22a requests the monitoring device 10a to perform mutual authentication. Specifically, the mutual authentication unit 2200 of the monitoring target device 22a creates a random number for mutual authentication which is a random number. Then, the mutual authentication unit 2200 transmits a mutual authentication request command and the random number for mutual authentication to a predefined connection destination address (the monitoring device 10a) (step S00).

When the mutual authentication request command and the random number for mutual authentication are received from the outside (the monitoring target device 22a), the mutual authentication reception unit 1000 of the monitoring device 10a encrypts the received random number for mutual authentication with a common key SK recorded in the ROM 101 of the monitoring device (step S01). Then, the mutual authentication reception unit 1000 replies with the random number for mutual authentication encrypted with the common key SK (encrypted random number for mutual authentication) to a transmission source (the monitoring target device 22a) (step S02).

The mutual authentication unit 2200 of the monitoring target device 22a decrypts the encrypted random number for mutual authentication received from the monitoring device 10a with the common key SK recorded in the ROM 221 of the monitoring target device. In addition, the mutual authentication unit 2200 determines whether the random number for mutual authentication decrypted with the common key SK and the random number for mutual authentication created in step S00 match (step S03). When a result of determination of matching is that the two match, the monitoring target device 22a determines that the authentic monitoring device 10a is a communication target and advances to a circuit information distribution phase.

Here, all exchanges of information between devices performed in subsequent phases (a circuit information distribution phase (FIG. 6) and a device authentication phase (FIG. 7)) are performed by a common key encryption method using a common key SK.

When a result of determination of matching is that the two do not match, the monitoring target device 22a determines that the authentic monitoring device 10a is not a communication target and stops the subsequent process.

(Processing flow of circuit information distribution phase)

Figure 6:
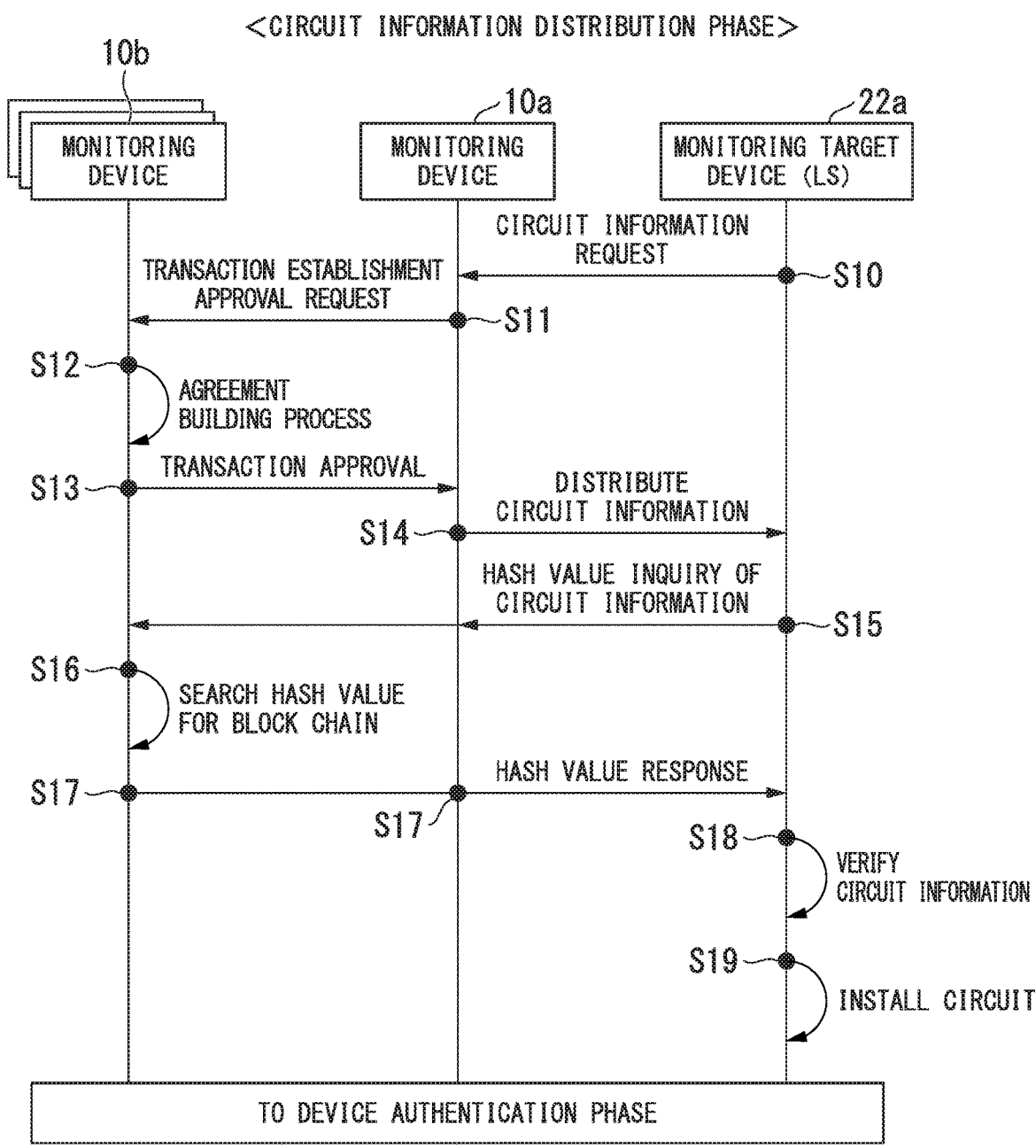
FIG. 6 is a diagram showing a processing flow of a circuit information distribution phase executed between the monitoring device and the monitoring target device according to the first embodiment.

FIG. 6 is a diagram showing a processing flow of a circuit information distribution phase executed between the monitoring device and the monitoring target device according to the first embodiment.

The processing flow of a circuit information distribution phase shown in FIG. 6 starts from a stage in which mutual authentication is performed via a mutual authentication phase (steps S00 to S03 in FIG. 5).

First, the monitoring target device 22a requests the monitoring device 10a to distribute circuit information. Specifically, the circuit forming unit 2201 of the monitoring target device 22a transmits a circuit information request command to the monitoring device 10a (step S10). In the circuit information request command, a device ID (for example, a serial number, etc.) that can individually identify a product (the monitoring target device 22a itself) is included.

When the circuit information request command is received from the monitoring target device 22a, the circuit information distribution unit 1001 of the monitoring device 10a requests another monitoring device 10b constituting the monitoring system 1 to approve transaction establishment (step S11). Specifically, the circuit information distribution unit 1001 transmits a transaction establishment approval request command and a circuit information request command from the monitoring target device 22a to all of the other monitoring devices 10b.

When the transaction establishment approval request command and the circuit information request command from the monitoring target device 22a are received from the monitoring device 10a, the other monitoring devices 10b perform an agreement building process for determining whether to distribute circuit information in response to the circuit information request command (step S12). Specifically, the other monitoring devices 10b determine whether a device ID (identification information of the monitoring target device 22a) included in the circuit information request command is registered in a distributed ledger (the recording medium 104) of the distributed ledger system in advance. Here, a device ID of the monitoring target device 22a added to the embedded system 2 is registered in the distributed ledger in advance (refer to FIG. 8 and FIG. 9).

In addition, the other monitoring devices 10b verify whether there is a trace of tampering in the circuit information request command from the monitoring target device 22a.

Here, in the agreement building process performed by the monitoring device 10a and the other monitoring devices 10b in step S12, a generally known agreement building algorithm (for example, practical byzantine fault tolerance; PBFT, etc.) may be used.

As a result of the above determination and verification, when no problem is found in the content of the circuit information request command from the monitoring target device 22a, the other monitoring device 10b replies with a transaction approval command to the monitoring device 10a based on an agreement form of "circuit information may be distributed" (step S13).

When the transaction approval command is received from the other monitoring device 10b, the circuit information distribution unit 1001 of the monitoring device 10a distributes circuit information registered in the distributed ledger (the recording medium 104) in advance to the monitoring target device 22a (step S14). Here, in the circuit information, circuit information for forming a PUF circuit C_PUF in the FPGA 222 of the monitoring target device 22*a* and circuit information for forming an encryption key generation circuit C_ENC are included.

When the circuit information is received from the monitoring device 10*a*, the circuit forming unit 2201 of the monitoring target device 22*a* verifies validity of the circuit information. Specifically, the circuit forming unit 2201 transmits a hash value inquiry command of the circuit information received in step S14 to the monitoring device 10*a* and the other monitoring device 10*b* (step S15).

When the hash value inquiry command of the circuit information is received from the monitoring target device 22*a*, the monitoring device 10*a* and the other monitoring device 10*b* refer to the recording medium 104 and search for a hash value of the circuit information distributed to the monitoring target device 22*a* (step 816).

Figure 10:
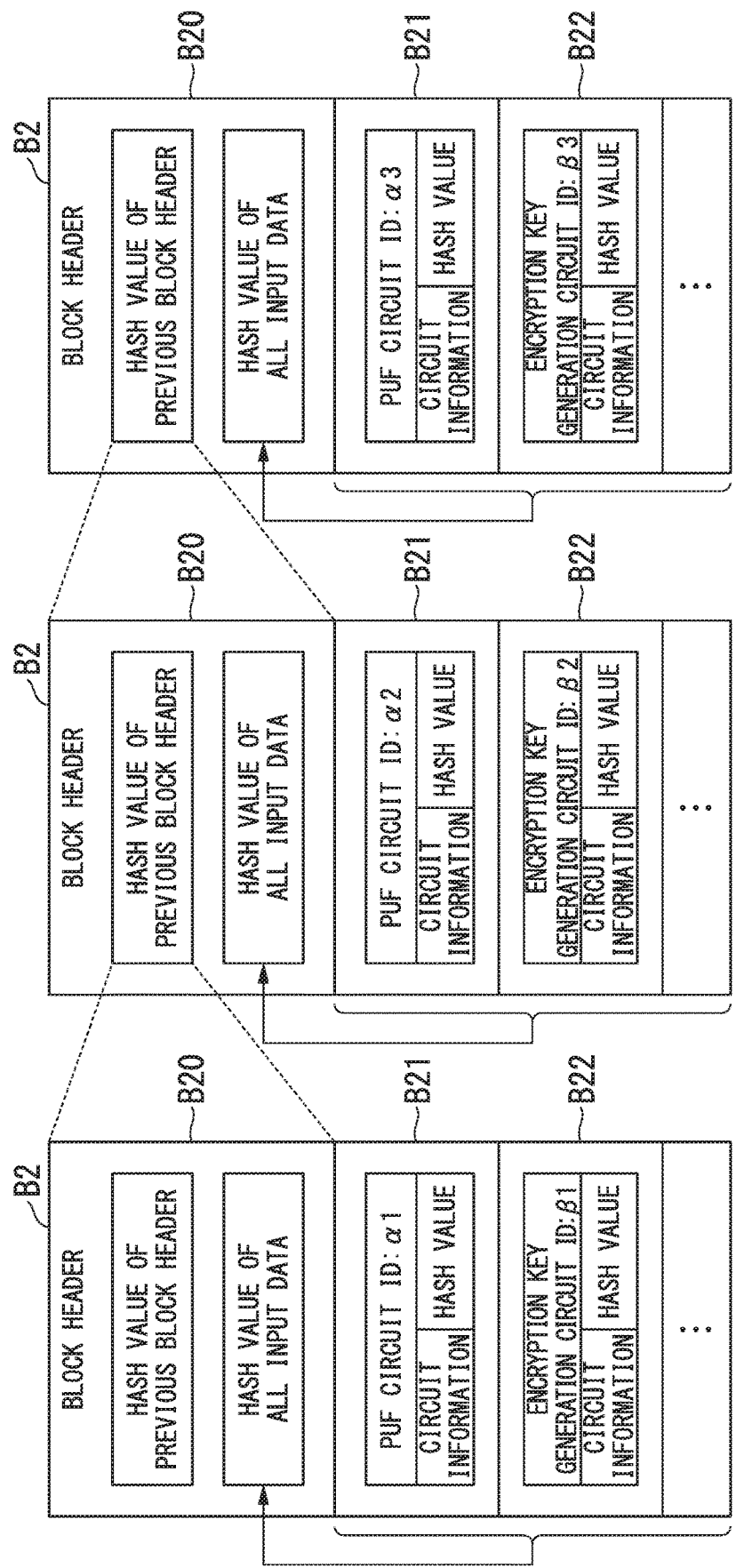
FIG. 10 is a diagram showing a data structure of a second distributed ledger recorded in the monitoring device according to the first embodiment.

Here, the circuit information distributed in step S14 and a hash value of the circuit information are registered in advance in the distributed ledger (the recording medium 104) of the distributed ledger system (refer to FIG. 10).

The monitoring device 10*a* and the other monitoring device 10*b* reply with the found result of the hash value of the circuit information recorded in the respective distributed ledger (the recording medium 104) to the monitoring target device 22*a* (step S17).

When the hash value of the circuit information is received from the monitoring device 10*a* and the other monitoring device 10*b*, the circuit forming unit 2201 of the monitoring target device 22*a* verifies the circuit information received from the monitoring device 10*a* (step S18). Specifically, the circuit forming unit 2201 itself calculates the hash value of the circuit information received from the monitoring device 10*a* in step S14 and determines whether the calculation result matches the hash value received in step S17.

When the calculation result of the hash value of the circuit information received in step S14 matches the hash value received in step S17, it can be determined that the circuit information received in step S14 is authentic. In this case, the circuit forming unit 2201 forms (installs) a PUF circuit C_PUF and an encryption key generation circuit C_ENC in the FPGA 222 of the monitoring target device based on the circuit information received in step S14 (step S19).

After a PUF circuit C_PUF and an encryption key generation circuit C_ENC are formed in the FPGA 222 of the monitoring target device, the monitoring target device 22*a* advances to the device authentication phase using the formed PUF circuit C_PUF.

On the other hand, when the calculation result of the hash value of the circuit information received in step S14 does not match the hash value received in step S17, the circuit forming unit 2201 determines that authentic circuit information is not received, and does not form a PUF circuit C_PUF and an encryption key generation circuit C_ENC in the FPGA 222 of the monitoring target device.
(Processing flow of device authentication phase)

Figure 7:
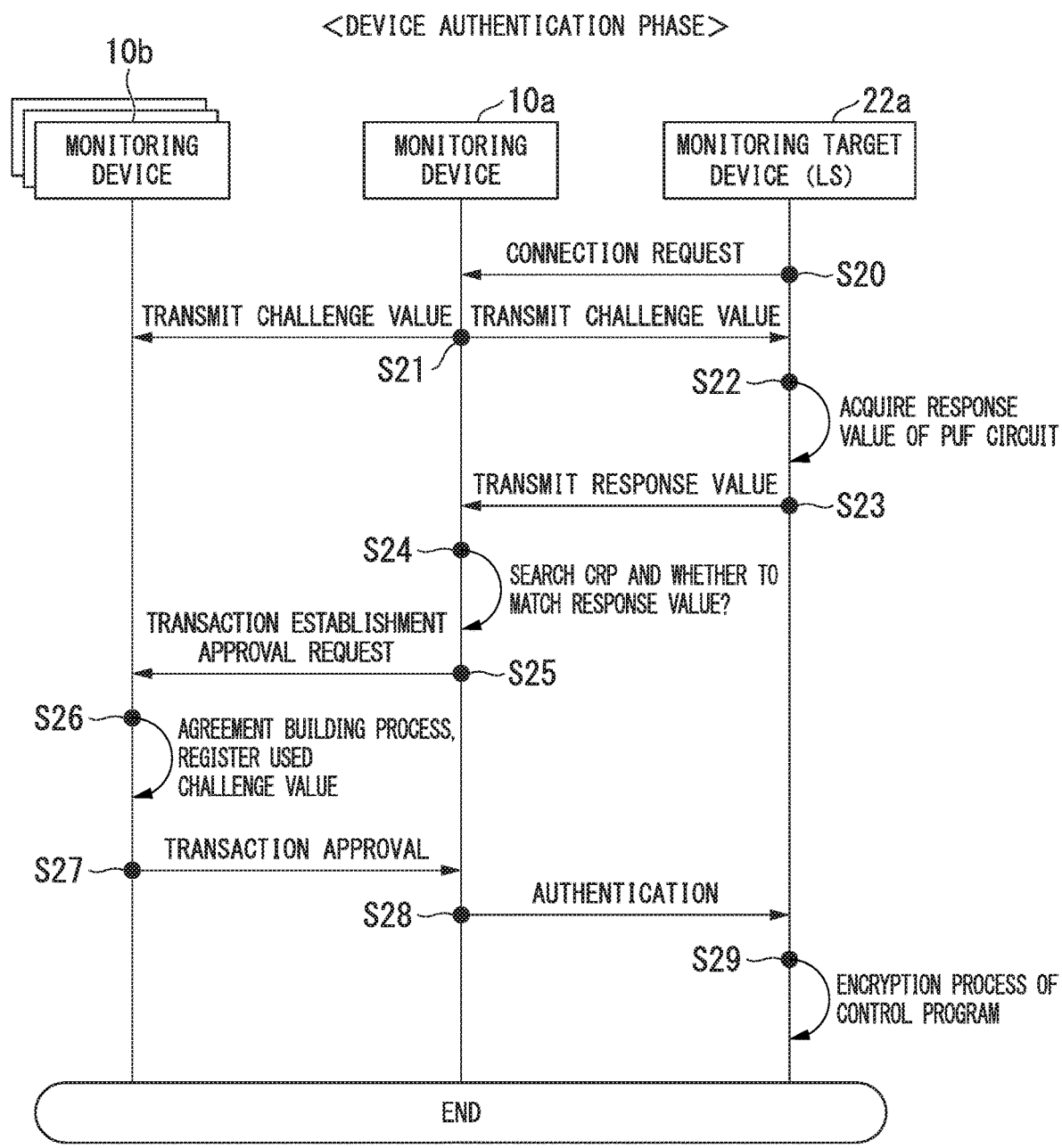
FIG. 7 is a diagram showing a processing flow of a device authentication phase executed between the monitoring device and the monitoring target device according to the first embodiment.

FIG. 7 is a diagram showing a processing flow of a device authentication phase executed between the monitoring device and the monitoring target device according to the first embodiment.

The processing flow of a device authentication phase shown in FIG. 7 starts from a stage in which a PUF circuit C_PUF is formed in the FPGA 222 of the monitoring target device 22*a* via a circuit information distribution phase (steps S10 to S19 in FIG. 6).

First, the device authentication request unit 2202 of the monitoring target device 22*a* transmits a device authentication request command to the monitoring device 10*a* so that it receives formal authentication as one constituent device of the embedded system 2 (step S20).

When the device authentication request command is received from the monitoring target device 22*a*, the device authentication unit 1002 of the monitoring device 10*a* (the transmission processing unit 1002A) selects one challenge value from CRP information registered in the distributed ledger (the recording medium 104) (refer to FIG. 8 and FIG. 9), and transmits the selected challenge value to the monitoring target device 22*a* and all of the monitoring devices 10*b* (step S21).

When the challenge value is received from the monitoring device 10*a*, the device authentication request unit 2202 inputs the challenge value to a PUF circuit C_PUF of the FPGA 222. Then, the device authentication request unit 2202 acquires an output value output from the PUF circuit C_PUF corresponding to the input as a response value of the PUF circuit C_PUF (step S22).

The device authentication request unit 2202 transmits the response value acquired in step S22 to the monitoring device 10*a* (step S23). The device authentication unit 1002 of the monitoring device 10*a* (the reception processing unit 1002B) receives the response value of the PUF circuit C_PUF from the monitoring target device 22*a*.

Figure 8:
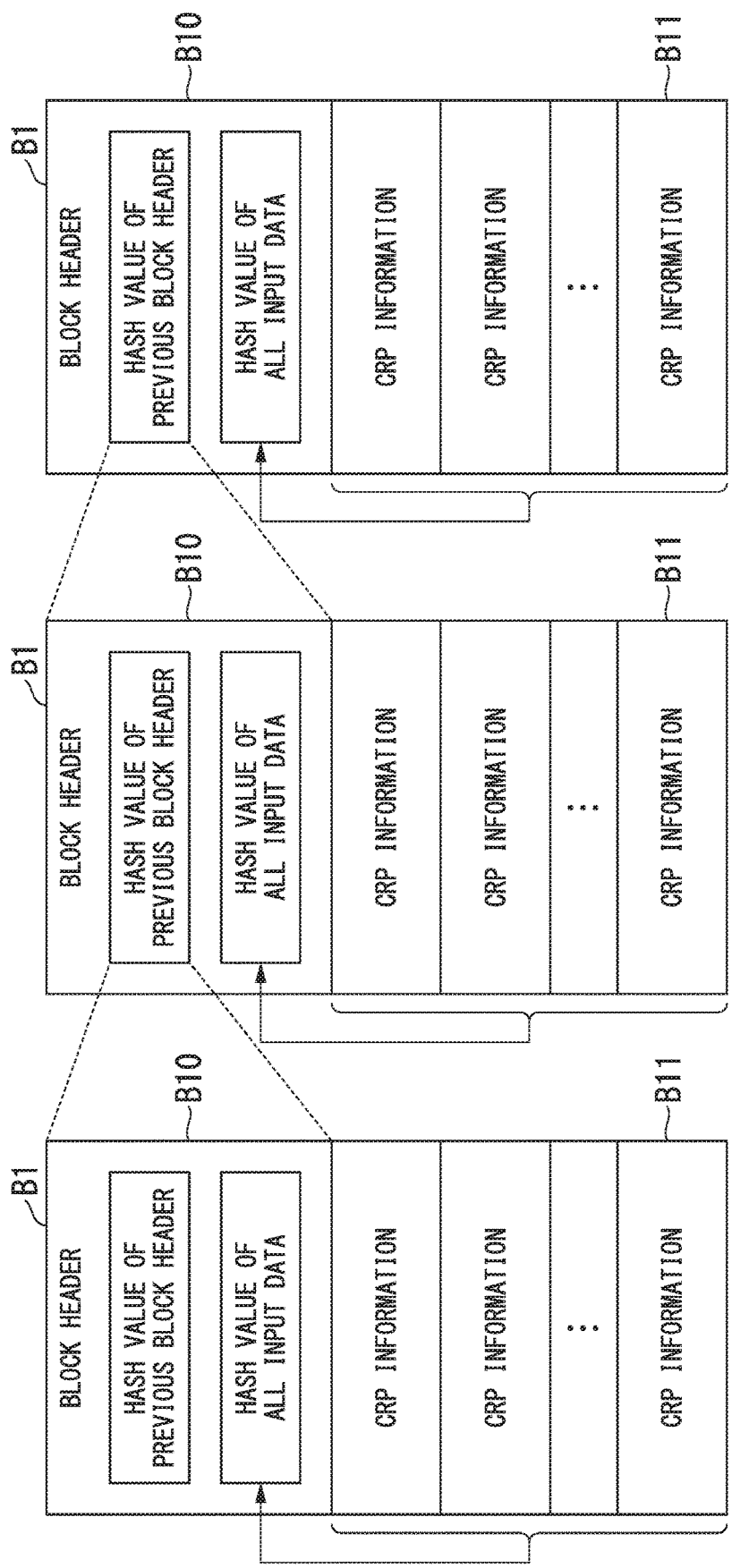
FIG. 8 is a diagram showing a data structure of a first distributed ledger recorded in the monitoring device according to the first embodiment.

Next, the device authentication unit 1002 of the monitoring device 10*a* (the authentication processing unit 1002C) searches a response value corresponding to the challenge value transmitted in step S21 from CRP information registered in the distributed ledger (refer to FIG. 8 and FIG. 9). Then, the device authentication unit 1002 determines whether the found response value (response value recorded in the CRP) matches the response value received in step S23 (step S24).

When a result of determination of matching in step S24 is that the two match, the device authentication unit 1002 requests the other monitoring device 10*b* constituting the monitoring system 1 to approve transaction establishment (step S25). Specifically, the device authentication unit 1002 transmits the transaction establishment approval request command and the response value from the monitoring target device 22*a* received in step S23 to all of the other monitoring devices 10*b*.

When the transaction establishment approval request command and the response value from the monitoring target device 22*a* are received from the monitoring device 10*a*, the other monitoring device 10*b* performs an agreement building process for determining whether the monitoring target device 22*a* that has transmitted the response value is formally authenticated as one constituent device of the embedded system 2 (step S26). Specifically, the other monitoring devices 10*b* search a response value corresponding to the challenge value received in step S21 from the CRP registered in the distributed ledger (the recording medium 104). Then, the device authentication unit 1002 determines whether the found response value (the response value recorded in the CRP) matches the response value received in step S23.

Here, in the agreement building process performed by the monitoring device 10*a* and the other monitoring device 10*b* in step S26, a generally known agreement building algorithm (for example, PBFT, etc.) may be used.

In addition, the monitoring device 10*a* and the monitoring device 10*b* newly register the challenge value (used challenge value) transmitted to the monitoring target device 22*a* in step S21, the result of the agreement building process, and information such as the year, month, day, hour, minute, and the like when the agreement building process is performed in the distributed ledger (step S26).

As a result of the above determination of matching, when the response value from the monitoring target device 22a matches the response value recorded in each CRP, the other monitoring device 10b replies with a transaction approval command to the monitoring device 10a based on an agreement form of "it may be formally authenticated as one constituent device of the embedded system 2" (step S27).

When the transaction approval command is received from the other monitoring device 10b, the device authentication unit 1002 of the monitoring device 10a distributes an authentication command to the monitoring target device 22a in response to the device authentication request command in step S20 (step S28). When the authentication command is distributed from the monitoring device 10a, for example, the EMS 21 (FIG. 2) of the embedded system 2 transmits a control program for operating as one constituent device of the embedded system 2 (logic solver) to the monitoring target device 22a as triggered by the reception of the authentication command from the monitoring device 10a.

The encryption processing unit 2203 of the monitoring target device 22a encrypts the control program received from the EMS 21 and records it in the flash ROM 224 of the monitoring target device 22a (step S29). The process of step S29 performed by the encryption processing unit 2203 will be described below in detail.

(Data structure of first distributed ledger)

FIG. 8 is a diagram showing a data structure of a first distributed ledger recorded in a monitoring device according to the first embodiment.

In addition, FIG. 9 is a diagram showing a data structure of input and output correspondence information (CRP) recorded in the monitoring device according to the first embodiment.

FIG. 8 shows a data structure of a first distributed ledger recorded in the recording medium 104 of the monitoring device 10a.

As shown in FIG. 8, blocks B1 constituting the first distributed ledger include a block header B10 and CRP information B11.

The block header B10 includes a hash value of all data (CRP information B11) included in each of the blocks B1 and a hash value of a previous block header (the block header B10 of the block B1 registered previously).

In the CRP information B11, a CRP obtained by measurement in advance is recorded for each product (the monitoring target device 22a) and for each PUF circuit.

Here, the CRP information will be described in detail with reference to FIG. 9.

As shown in FIG. 9, the CRP information shows a device ID that can identify the monitoring target device 22a, a PUF circuit ID that can identify a type (logical configuration) of a PUF circuit, and a correspondence relationship between a challenge value and a response value of a PUF circuit C_PUF identified by a device ID and a PUF circuit ID.

In this manner, the challenge value and the response value are shown as a value of a predetermined number of bits (for example, 128 bits). CRP information is measured for each type of devices and PUF circuits in a stage before shipment of the monitoring target device 22a and registered in the distributed ledger.

The device authentication unit 1002 of the monitoring device 10a selects one challenge value from CRP information shown in FIG. 9 and transmits it to the monitoring target device 22a in the process of step S21 in FIG. 7.

In addition, the device authentication unit 1002 searches a response value corresponding to the challenge value transmitted in step S21 from CRP information shown in FIG. 9 in the process of step S24 in FIG. 7. Then, the device authentication unit 1002 determines whether the found response value (the response value recorded in the CRP) matches the response value received in step S23.

(Data structure of second distributed ledger)

FIG. 10 shows a data structure of a second distributed ledger recorded in the recording medium 104. As shown in FIG. 10, blocks B2 constituting the second distributed ledger include a block header B20, and circuit information and a hash value of a PUF circuit (hereinafter referred to as a PUF circuit information group B21), and circuit information and a hash value of an encryption key generation circuit (hereinafter referred to as an encryption key generation circuit information group B22).

The block header B20 includes a hash value of all data (the PUF circuit information group B21 and the encryption key generation circuit information group B22) included in each of the blocks B2 and a hash value of a previous block header (the block header B20 of the block B2 registered previously).

In the process of step S14 in FIG. 6, the circuit information distribution unit 1001 of the monitoring device 10a identifies circuit information of the PUF circuit information group B21 and circuit information of the encryption key generation circuit information group B22, for circuits that will be installed in the monitoring target device 22a, from the second distributed ledger shown in FIG. 10 and transmits it to the monitoring target device 22a.

In addition, in the process of step S16 in FIG. 6, when the hash value inquiry command of the circuit information is received from the monitoring target device 22a, the monitoring device 10a and the other monitoring device 10b search for a hash value of each circuit information recorded in the second distributed ledger shown in FIG. 10.

(Processing flow after authentication)

Figure 11A:
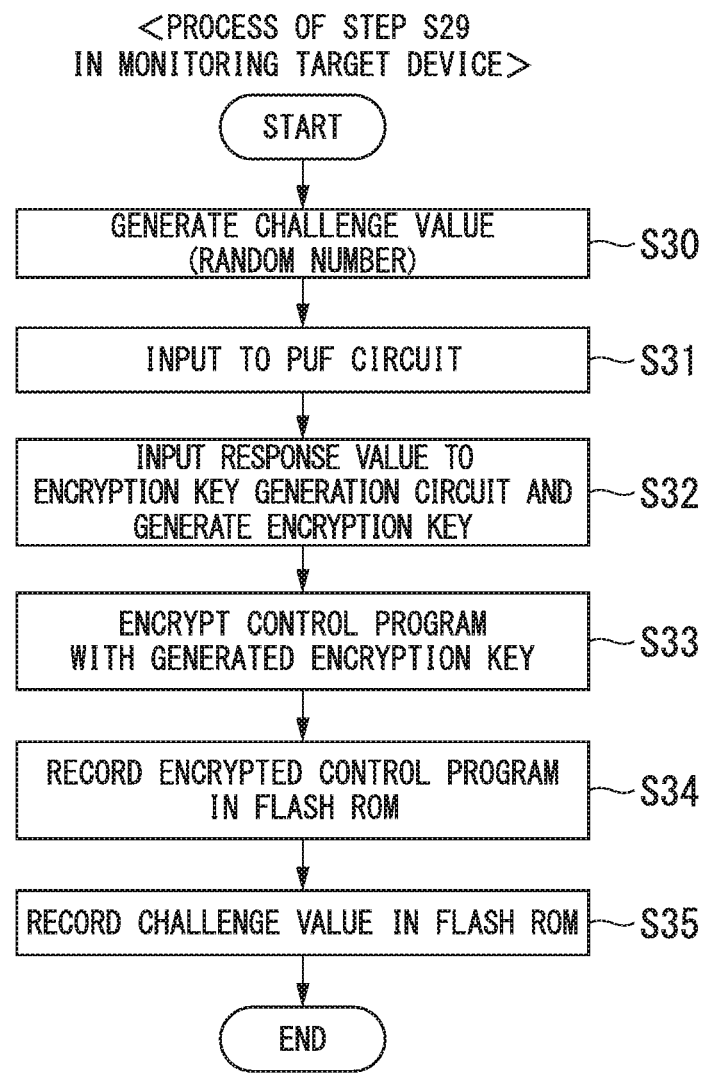
FIG. 11A is a diagram showing a processing flow of the monitoring target device according to the first embodiment.
Figure 11B:
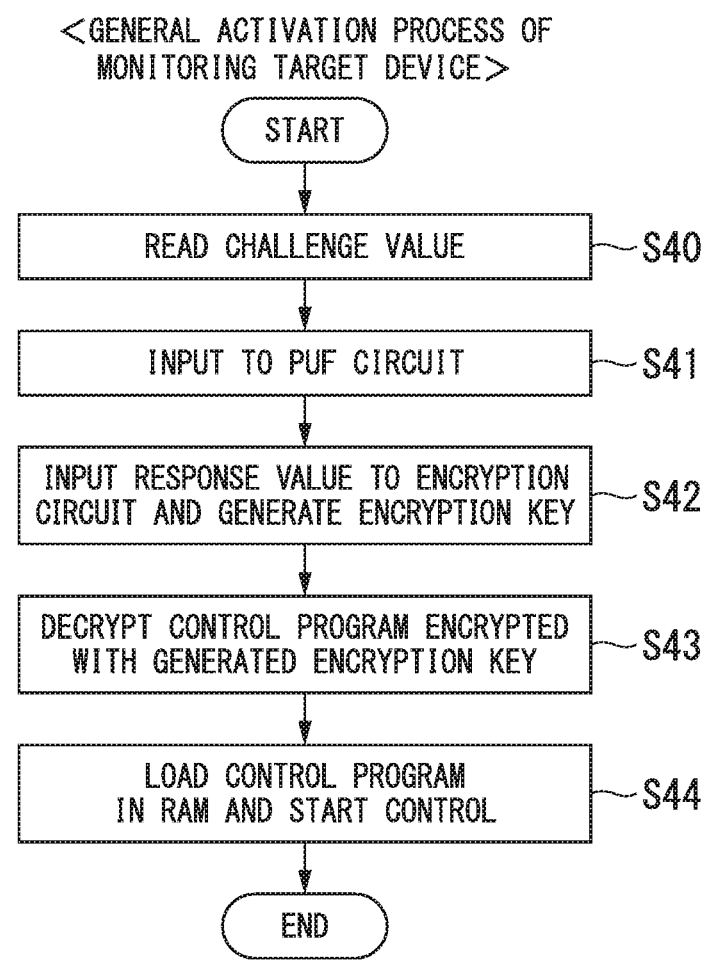
FIG. 11B is a diagram showing a processing flow of the monitoring target device according to the first embodiment.

FIG. 11A and FIG. 11B are diagrams showing a processing flow of the monitoring target device according to the first embodiment.

First, a process performed by the monitoring target device 22a immediately after authentication is performed by the monitoring device 10a will be described with reference to FIG. 11A (process of step S29 in FIG. 7).

As shown in FIG. 11A, the encryption processing unit 2203 of the monitoring target device 22a generates an arbitrary challenge value CH (random number) (step S30). Here, the generated challenge value CH may be an arbitrary random number regardless of the challenge value (challenge value recorded in CRP information) used in the device authentication phase (FIG. 7).

Next, the encryption processing unit 2203 inputs the challenge value CH generated in step S30 to the PUF circuit C_PUF of the FPGA 222 (step S31).

Next, as a result of step S31, the encryption processing unit 2203 acquires the response value output from the PUF circuit C_PUF. Then, the encryption processing unit 2203 inputs the acquired response value to the encryption key generation circuit C_ENC of the FPGA 222 and generates an encryption key (step S32).

Next, the encryption processing unit 2203 encrypts the control program acquired in step S28 with the encryption key generated in step S32 (step S33).

Next, the encryption processing unit 2203 writes the control program E_PRG encrypted in step S33 in the flash ROM 224 (step S34).

At the same time, the encryption processing unit 2203 writes the challenge value CH generated in step S30 in the flash ROM 224 (step S35).

Next, a process (general activation process) when the monitoring target device 22a is activated for the second time and thereafter will be described with reference to FIG. 11B.

As a result of the process shown in FIG. 11A, in the monitoring target device 22a, the encrypted control program E_PRG is written in the flash ROM 224. When activated for the second time and thereafter, the monitoring target device 22a decrypts the encrypted control program E_PRG and performs an operation as one constituent device of the embedded system 2.

Specifically, the decrypting processing unit 2204 of the monitoring target device 22a reads and acquires the challenge value CH recorded in the flash ROM 224 (step S40).

Next, the decrypting processing unit 2204 inputs the challenge value CH acquired in step S40 to the PUF circuit C_PUF of the FPGA 222 (step S41).

Next, as a result of step S41, the decrypting processing unit 2204 acquires the response value output from the PUF circuit C_PUF. Then, the decrypting processing unit 2204 inputs the acquired response value to the encryption key generation circuit C_ENC of the FPGA 222 and generates an encryption key (step S42).

Next, the decrypting processing unit 2204 decrypts the encrypted control program E_PRG recorded in the flash ROM 224 with the encryption key generated in step S42 (step S43).

Next, the decrypting processing unit 2204 loads the control program decrypted in step S43 into the RAM 223 (step S44).

As a result, the CPU 220 of the monitoring target device 22a operates according to a control program that is loaded into the RAM 223.

(Actions and effects)

As described above, the monitoring device 10a according to the first embodiment is one of a plurality of nodes constituting the distributed ledger system and monitors an information processing device (for example, a logic solver, an IO device, etc.) constituting the embedded system 2 as the monitoring target device 22a.

The monitoring device 10a includes the circuit information distribution unit 1001 (refer to step S14 in FIG. 6) configured to distribute circuit information for forming a PUF circuit C_PUF to the monitoring target device 22a, the transmission processing unit 1002A (refer to step S21 in FIG. 7) configured to transmit a predetermined challenge value to the monitoring target device 22a to which circuit information is distributed, the reception processing unit 1002B (refer to step S23 in FIG. 7) configured to receive a response value of the PUF circuit C_PUF formed in the monitoring target device 22a, and the authentication processing unit 1002C (refer to step S24 in FIG. 7) configured to authenticate the monitoring target device 22a based on input and output correspondence information (CRP) of the PUF circuit C_PUF formed in the monitoring target device 22a and the received response value.

In addition, the above CRP and circuit information are registered in advance in the distributed ledger system constituted by the monitoring system 1.

In addition, as described above, the monitoring target device 22a (information processing device) according to the first embodiment includes the circuit forming unit 2201 configured to request (refer to step S10 in FIG. 6) circuit information from the monitoring device 10a when no PUF circuit C_PUF is not formed in the monitoring target device and form a PUF circuit C_PUF based on the circuit information received from the monitoring device 10a, and the device authentication request unit 2202 configured to request (refer to step S20 in FIG. 7) the monitoring device 10a to perform authentication when a PUF circuit C_PUF is formed. Then, the device authentication request unit 2202 inputs the challenge value received from the monitoring device in response to the authentication request to the PUF circuit (refer to step S23 in FIG. 7), and replies with a response value, which is its output result to the monitoring device 10a (refer to step S24 in FIG. 7).

According to the above configuration, the monitoring target device 22a is authenticated based on the CRP registered in advance in the distributed ledger system constituted by the monitoring system 1 (refer to steps S20 to S28 in FIG. 7). Therefore, since a resistance to tampering of the CRP is strengthened, it is possible to increase the reliability of validity verification of the product using a PUF.

In addition, according to the above configuration, before the device authentication phase, a process of forming a PUF circuit is performed based on circuit information distributed from the outside for the monitoring target device 22a (refer to steps S10 to S19 in FIG. 6). Thereby, since the monitoring target device 22a in which no PUF circuit C_PUF is formed is shipped, it is possible to suppress the occurrence of information leakage of the PUF circuit C_PUF.

In addition, the monitoring device 10a (the authentication processing unit 1002C) according to the first embodiment additionally authenticates a monitoring target device based on a result of an agreement building process performed by a plurality of other nodes constituting the distributed ledger system (refer to steps S25 to S27 in FIG. 7).

Accordingly, since acceptance or rejection of authentication is determined based on the CRP in each of the plurality of nodes, it is possible to increase the reliability of acceptance or rejection of the authentication.

In addition, when a hash value inquiry of circuit information distributed by the monitoring device 10a is received from the monitoring target device 22a, the monitoring device 10a (the circuit information distribution unit 1001) according to the first embodiment transmits a hash value of the circuit information registered in advance in the distributed ledger system. Accordingly, the monitoring target device 22a can verify the validity of the received circuit information based on the hash value transmitted from all nodes (the monitoring device 10). That is, the monitoring target device 22a can obtain confirmation that the distributed circuit information is authentic (recorded in the distributed ledger system).

(Modified examples of first embodiment)

While the monitoring system 1 and the monitoring device 10 according to the first embodiment have been described above in detail, specific forms of the monitoring system 1 and the monitoring device 10 are not limited to the above forms, and various design modifications and the like without departing from the spirit and scope of the invention can be made.

For example, a case in which the monitoring device 10a and the other monitoring devices 10b according to the first embodiment perform an agreement building process for determining whether to authenticate the monitoring target device 22a and register the challenge value (used challenge value) and the like transmitted to the monitoring target device 22a in a new distributed ledger (the recording medium 104) in step S26 in FIG. 7 has been described.

Here, furthermore, when a device authentication process is performed again on the monitoring target device 22a, in step S21 in FIG. 7, the monitoring device 10a may refer to the distributed ledger, and select and transmit only a challenge value that is not registered as a used challenge value (that is, a challenge value that has never been transmitted to the monitoring target device 22a).

Accordingly, since challenge value transmitted by the monitoring device 10a to the monitoring target device 22a in the device authentication phase is always transmitted for the first time, it is possible to reduce a risk of the challenge value being learned by a third party through eavesdropping.

In addition, a case in which the circuit information distribution unit 1001 according to the first embodiment distributes both circuit information for forming a PUF circuit C_PUF and circuit information for forming an encryption key generation circuit C_ENC (refer to step S14 in FIG. 6) has been described. In addition, a case in which the encryption processing unit 2203 inputs a response value of the PUF circuit C_PUF to the encryption key generation circuit C_ENC and generates an encryption key, and also encrypts a control program using the encryption key (refer to steps S32 to S33 in FIG. 11A) has been described. However, other embodiments are not limited to the above form.

That is, the circuit information distribution unit 1001 according to another embodiment may distribute only circuit information for forming a PUF circuit C_PUF, and also, the encryption processing unit 2203 of the monitoring target device 22a directly encrypts a control program using a response value of a PUF circuit C_PUF. Here, in this case, the decrypting processing unit 2204 of the monitoring target device 22a may directly decrypt an encrypted control program E_PRG using the response value of the PUF circuit C_PUF.

In addition, a case in which the monitoring system 1 and the other monitoring devices 10 according to the first embodiment are installed outside the embedded system 2 (refer to FIG. 1 and FIG. 2) has been described. However, other embodiments are not limited to the above form.

That is, functions (FIG. 3) of the monitoring device 10a may be incorporated in the OPS 20, the EMS 21, and the like installed as constituent devices of the embedded system 2.

In addition, a form in which a plurality of monitoring devices 10 are virtually installed in one hardware item (housing) may be used.

Second Embodiment

Figure 12:
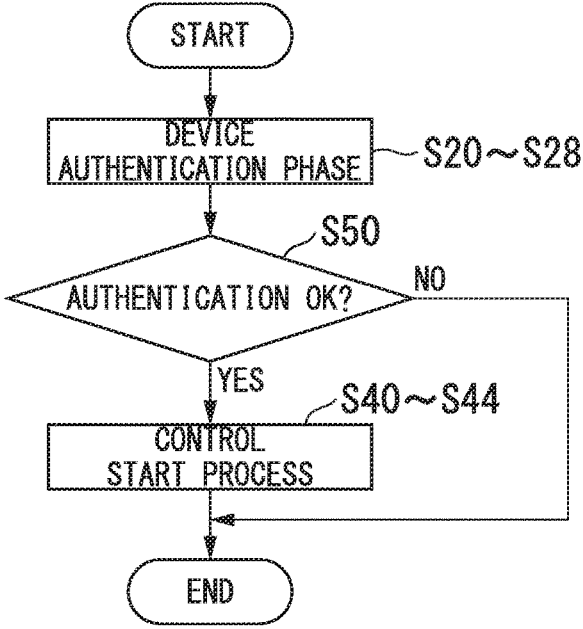
FIG. 12 is a diagram showing a processing flow of a monitoring target device according to a second embodiment.

Next, a monitoring system and a monitoring target device according to a second embodiment will be described with reference to FIG. 12.
(Processing flow of monitoring target device)
FIG. 12 is a diagram showing a processing flow of a monitoring target device according to the second embodiment.

A process (general activation process) when the monitoring target device 22a according to the second embodiment is activated for the second time and thereafter will be described with reference to FIG. 12.

When activated for the second time and thereafter, the monitoring target device 22a according to the second embodiment executes again a device authentication phase. That is, when activated for the second time and thereafter, the monitoring target device 22a requests again the monitoring device 10a to authenticate a device (step S20 in FIG. 7). Then, after the authentication process (steps S21 to S27) has been performed by the monitoring device 10a or the like, authentication is received again from the monitoring device 10a (step S28 in FIG. 7).

The monitoring target device 22a determines whether the monitoring target device is successfully authenticated by the monitoring device 10a in the device authentication phase (steps S20 to S28) (step S50).

When the monitoring target device is successfully authenticated (YES in step S50) in the device authentication phase (steps S20 to S28), the monitoring target device 22a performs a control activation process (steps S40 to S44 in FIG. 11B) and performs an operation according to the control program.

On the other hand, when the monitoring target device is not successfully authenticated (NO in step S50) in the device authentication phase (steps S20 to S28), the monitoring target device 22a ends the process without performing the control activation process (steps S40 to S44 in FIG. 11B).
(Actions and effects)

As described above, when the encrypted control program E_PRG is recorded in the flash ROM 224 and is then again activated, the monitoring target device 22a according to the second embodiment executes the device authentication phase (steps S20 to S28 in FIG. 7) again, and obtains authentication, and then decrypts and executes the encrypted control program E_PRG (steps S40 to S44 in FIG. 11B).

That is, according to the monitoring target device 22a according to the second embodiment, when authentication is received from the monitoring device 10a (YES in step S50) as a result of the authentication request (step S20 in FIG. 7), the decrypting processing unit 2204 decrypts the encrypted control program E_PRG in advance.

Here, according to the monitoring target device 22a of the first embodiment, when the monitoring target device 22a itself is stolen, the control program is decrypted and executed (steps S40 to S44 in FIG. 11B) automatically by simply activating the monitoring target device 22a in a destination of the stolen device. Then, the control program decrypted by a third party is investigated and know-how can be leaked.

However, according to the monitoring target device 22a of the second embodiment, when the monitoring target device 22a is activated standalone in a destination of the stolen device, since authentication by the monitoring device 10a is not obtained (NO in step S50), the control program is not decrypted and executed (steps S40 to S44 in FIG. 11B). Thus, even if the monitoring target device 22a itself is stolen, it is possible to prevent know-how leakage of the control program.

Third Embodiment

Figure 13:
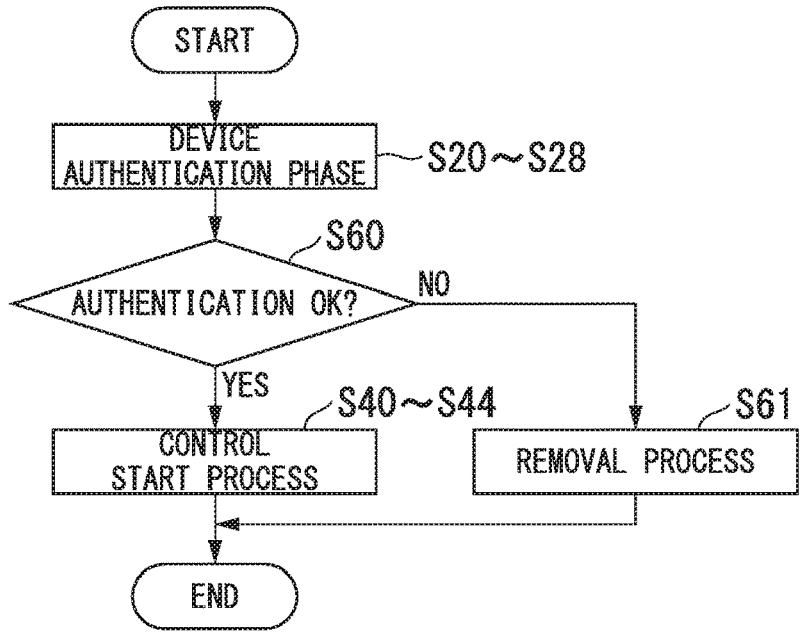
FIG. 13 is a diagram showing a processing flow of a monitoring target device according to a third embodiment.

Next, a monitoring system and a monitoring target device according to a third embodiment will be described with reference to FIG. 13.
(Processing flow of monitoring target device)
FIG. 13 is a diagram showing a processing flow of a monitoring target device according to the third embodiment.

A process (general activation process) when the monitoring target device 22a according to the third embodiment is activated for the second time and thereafter will be described with reference to FIG. 13.

When activated for the second time and thereafter, the monitoring target device 22a according to the third embodiment executes again the device authentication phase. That is, when activated for the second time and thereafter, the monitoring target device 22a again requests the monitoring device 10a to authenticate a device (step S20 in FIG. 7). Then, after the authentication process (steps S21 to S27) has been performed by the monitoring device 10a or the like, authentication is received again from the monitoring device 10a (step S28 in FIG. 7).

The monitoring target device 22a determines whether the device is successfully authenticated by the monitoring device 10a in the device authentication phase (steps S20 to S28) (step S60).

When a device is successfully authenticated (YES in step S60) in the device authentication phase (steps S20 to S28), the monitoring target device 22a performs the control activation process (steps S40 to S44 in FIG. 11B) and performs an operation according to the control program.

On the other hand, when the device is not successfully authenticated (NO in step S60) in the device authentication phase (steps S20 to S28), the monitoring target device 22a removes all of information (encrypted control program E_PRG, challenge value CH) recorded in advance in the flash ROM 224 and the circuit (PUF circuit C_PUF, encryption key generation circuit C_ENC) formed in the FPGA 222 (step S61).

(Actions and effects)

As described above, according to the monitoring target device 22a of the third embodiment, when authentication is not received from the monitoring device 10a as a result of the authentication request (step S20 in FIG. 7), the device authentication request unit 2202 removes the encrypted control program E_PRG and the like.

According to such a form, when the monitoring target device 22a is activated standalone in a destination of the stolen device, not only simply the decryption and execution of the control program (steps S40 to S44 in FIG. 11B) are avoided, but also all of information recorded in the flash ROM 224 and circuits formed in the FPGA 222 are removed. Therefore, when the monitoring target device 22a itself is stolen, it is possible to more reliably suppress the occurrence of information leakage.

Fourth Embodiment

Next, a monitoring system and a monitoring target device according to a fourth embodiment will be described with reference to FIG. 14.

(Data structure of input and output correspondence information)

Figures 14, 15:
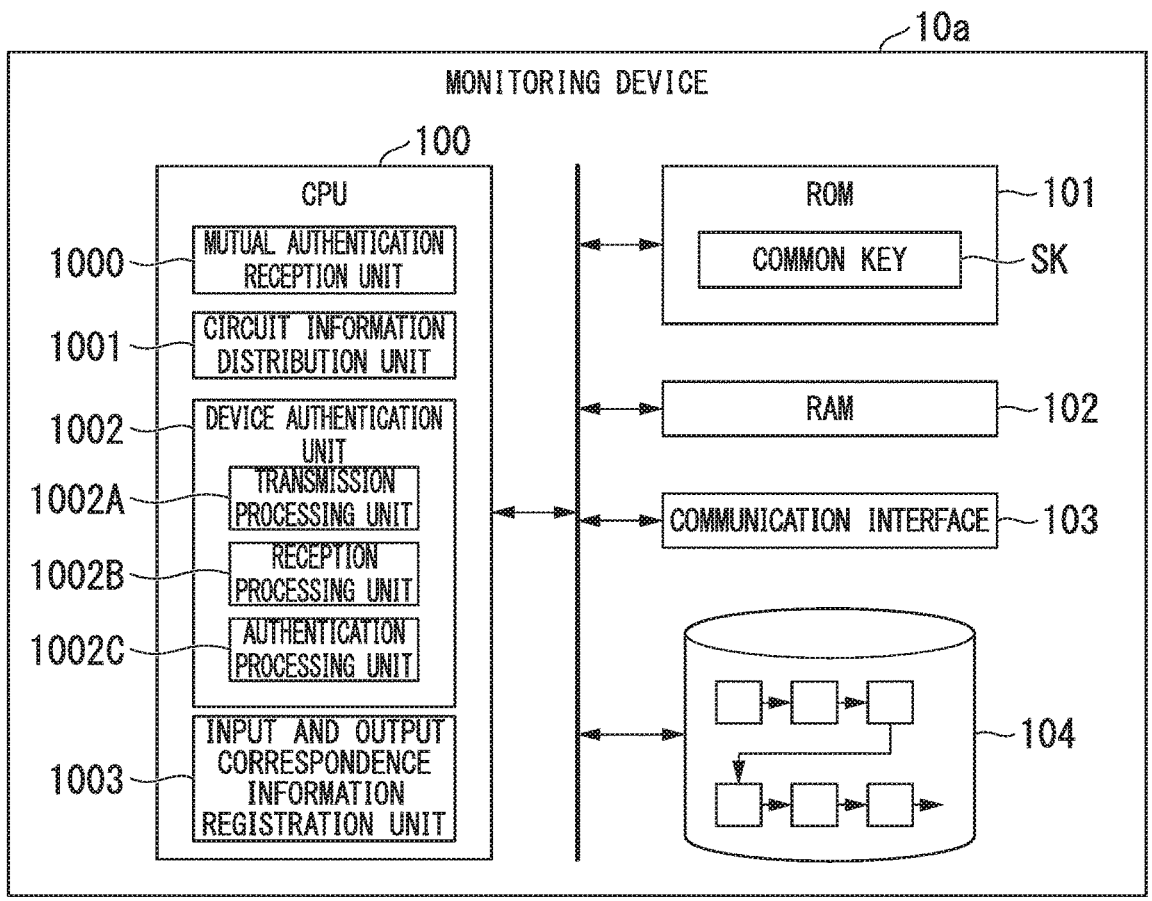
FIG. 14 is a diagram showing a data structure of input and output correspondence information recorded in a monitoring device according to a fourth embodiment.
FIG. 15 is a diagram showing a functional configuration of a monitoring device according to a fifth embodiment.

FIG. 14 is a diagram showing a data structure of input and output correspondence information recorded in a monitoring device according to the fourth embodiment.

Unlike the first embodiment (FIG. 9), in CRP information recorded in the monitoring device according to the fourth embodiment, a pair of a challenge value and a response value for each of two types of PUF circuit (PUF circuit ID: α1 and α2) are recorded for one monitoring target device 22a (device ID: X1).

In the present embodiment, for example, before shipment of the monitoring target device 22a (device ID: X1), the producer (manufacturer) of the monitoring target device 22a first installs a PUF circuit C_PUF identified by PUF circuit ID: α1 and measures a pair of a challenge value and a response value of the PUF circuit C_PUF (PUF circuit ID: α1). Next, the PUF circuit C_PUF identified by PUF circuit ID: α2 is installed and a pair of a challenge value and a response value of the PUF circuit C_PUF (PUF circuit ID: α2) are measured.

Then, the producer of the monitoring target device 22a registers CRP information shown in FIG. 14 in the distributed ledger.

(Actions and effects)

According to the above aspects, when all challenge values of the PUF circuit C_PUF (PUF circuit ID: α1) formed in the monitoring target device 22a (device ID: X1) are used, another PUF circuit C_PUF (PUF circuit ID: α2) is newly installed, and thus the monitoring target device 22a (device ID: X1) can be continuously used. In this case, immediately before challenge values are depleted, the monitoring target device 22a may request circuit information (step S10 in FIG. 6) for requesting circuit information regarding a new PUF circuit C_PUF (PUF circuit ID: α2).

In addition, in another embodiment, immediately before challenge values of the PUF circuit C_PUF (PUF circuit ID: α1) are depleted, the producer of the monitoring target device 22a may temporarily collect the monitoring target device 22a. Then, the producer of the monitoring target device 22a may install a new PUF circuit C_PUF identified by PUF circuit ID: α2 for the collected monitoring target device 22a, and may register a pair of a challenge value and a response value of the PUF circuit C_PUF (PUF circuit ID: α2) in the distributed ledger.

Fifth Embodiment

Next, a monitoring system and a monitoring target device according to a fifth embodiment will be described with reference to FIG. 15 and FIG. 16.

(Functional configuration of monitoring device)

FIG. 15 is a diagram showing a functional configuration of a monitoring device according to the fifth embodiment.

As shown in FIG. 15, the CPU 100 of the monitoring device 10a according to the fifth embodiment further exhibits a function as an input and output correspondence information registration unit 1003 in addition to the first to fourth embodiments. The input and output correspondence information registration unit 1003 first generates challenge values of a plurality of types (random numbers) in a new CRP registration phase to be described below, and transmits them to the monitoring target device 22a. Next, the input and output correspondence information registration unit 1003 receives response values corresponding to the challenge values from the monitoring target device 22a. Then, the input and output correspondence information registration unit 1003 creates input and output correspondence information of the PUF circuit C_PUF formed in the monitoring target device 22a and registers it in the distributed ledger system constituted by the monitoring system 1.

A processing flow performed by the input and output correspondence information registration unit 1003 in a new CRP registration phase will be described below in detail.

(Processing flow of new CRP registration phase)

Figure 16:
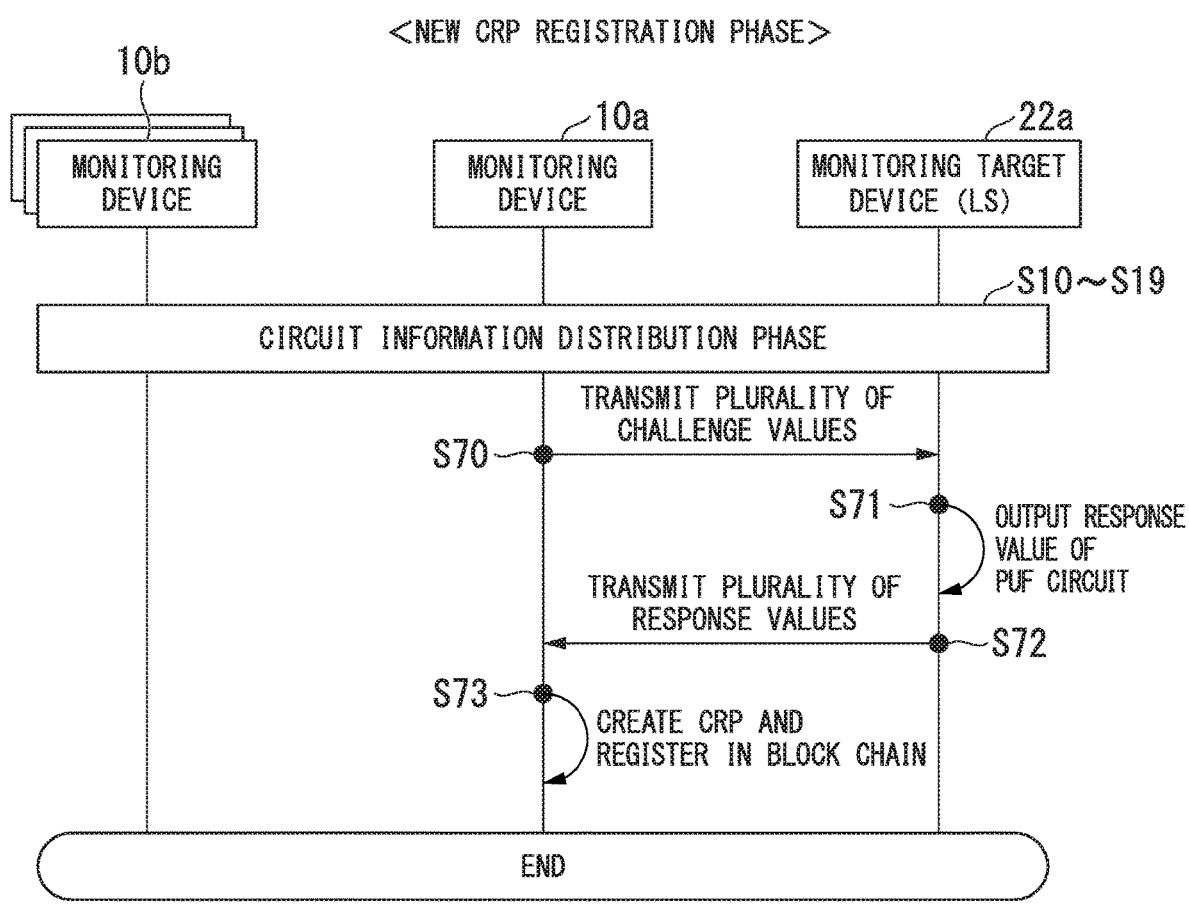
FIG. 16 is a diagram showing a processing flow of a new CRP registration phase executed between the monitoring device and a monitoring target device according to the fifth embodiment.

FIG. 16 is a diagram showing a processing flow of a new CRP registration phase executed between the monitoring device and the monitoring target device according to the fifth embodiment.

The processing flow of the new CRP registration phase shown in FIG. 16 is performed in, for example, a stage in which challenge values for one PUF circuit C_PUF (for example, PUF circuit ID: α1) formed in the monitoring target device 22a are depleted.

When challenge values for one PUF circuit C_PUF (PUF circuit ID: α1) are depleted, a circuit distribution phase (steps S10 to S19 in FIG. 6) is executed, and a new PUF circuit C_PUF (for example, PUF circuit ID: α2) is installed in the monitoring target device 22a.

Here, CRP information regarding the PUF circuit C_PUF (PUF circuit ID: α2) newly installed in the monitoring target device 22a is not registered in the distributed ledger in advance before shipment or the like.

In this case, the input and output correspondence information registration unit 1003 of the monitoring device 10a first generates a plurality of types of challenge values (random numbers) and transmits them to the monitoring target device 22a (step S70).

Next, the monitoring target device 22a inputs the plurality of types of challenge values which is generated to the newly installed PUF circuit C_PUF (PUF circuit ID: α2) and acquires response values (step S71).

Next, the monitoring target device 22a replies with a plurality of types of response values corresponding to the plurality of types of challenge values to the monitoring device 10a (step S72).

The monitoring device 10a creates CRP information (that is, CRP information regarding the newly installed PUF circuit C_PUF (PUF circuit ID: α2)) including pairs of challenge values and response values based on the plurality of challenge values transmitted in step S70 and the plurality of response values received from the monitoring target device 22a in step S72, and registers the CRP information in the distributed ledger (step S73).

(Actions and effects)

According to the above aspects, even after the monitoring target device 22a is installed in the embedded system 2, CRP information regarding the newly installed PUF circuit C_PUF can be created remotely. Therefore, for example, it is possible to save time and effort for creating CRP information regarding a plurality of types of PUF circuits C_PUF in advance before shipment as in the fourth embodiment.

Here, in the above embodiments, various processing procedures of the monitoring device 10 described above are stored in a computer readable recording medium in the form of a program, and when the program is read and executed by a computer, the various processes are performed. In addition, the computer readable recording medium is a magnetic disk, a magneto-optical disc, a CD-ROM, a DVD-ROM, a semiconductor memory, or the like. In addition, the computer program may be distributed to a computer through a communication line and the computer that has received the distributed program may execute the program.

The program may be a program for implementing a part of the above-described functionality and also be a so-called discrete file (a differential program) in which the above-described functionality is implemented in combination with a program that has already been recorded in the computer system.

In addition, in other embodiments, a form in which another computer connected via a network has some of functions of the monitoring device 10 described in the first to fifth embodiments (and modified examples thereof) may be used.

As described above, while some embodiments according to the present invention have been described, all of these embodiments are shown as examples, and are not intended to limit the scope of the invention. These embodiments can be implemented in various other forms, and various omissions, substitutions, and modifications can be made without departing from the spirit and scope of the invention. These embodiments and modifications thereof are included in the scope and spirit of the invention and included in the inventions described in the scope of the claims and scopes of equivalents thereof.

INDUSTRIAL APPLICABILITY

According to the aspects of the invention described above, it is possible to increase the reliability of authenticity determination of a product using a PUF.

REFERENCE SIGNS LIST

1 Monitoring system
10 Monitoring device
100 CPU
1000 Mutual authentication reception unit
1001 Circuit information distribution unit
1002 Device authentication unit
1002A Transmission processing unit
1002B Reception processing unit
1002C Authentication processing unit
101 ROM
102 RAM
103 Communication interface
104 Recording medium
2 Embedded system
20 OPS
21 EMS
22 Logic solver
23 10 device
22a Logic solver (monitoring target device)
220 CPU
2200 Mutual authentication unit
2201 Circuit forming unit
2202 Device authentication request unit
2203 Encryption processing unit
2204 Decrypting processing unit
221 ROM
222 FPGA
223 RAM
224 Flash ROM
225 Communication interface
SK Common key
C_PUF PUF circuit
C_ENC Encryption key generation circuit
E_PRG Encrypted control program
CH Challenge value

The invention claimed is:

1. A monitoring device configured to monitor a monitoring target device, the monitoring device comprising:
 a processor; and
 a non-transitory computer-readable medium having stored thereon executable instructions that, when executed by the processor, cause the monitoring device to function as:
 a circuit information distribution program configured to distribute circuit information for programming a physically unclonable function (PUF) circuit to the monitoring target device, the circuit information being registered in advance in a distributed ledger system including the monitoring device and at least one additional monitoring device;
 a transmission processing program configured to transmit a challenge value to the monitoring target device to which the circuit information is distributed;

a reception processing program configured to receive a response value corresponding to the challenge value of the PUF circuit programmed in the monitoring target device; and an authentication processing program configured to authenticate the monitoring target device based on (i) input and output correspondence information of the PUF circuit programmed in the monitoring target device, the input and output correspondence information being registered in advance in the distributed ledger system, and (ii) the response value which has been received, wherein an encryption processing program of the monitoring target device is configured to: (i) encrypt a control program for formally operating as one constituent device of an embedded system including the monitoring target device; and (ii) record the control program in the monitoring target device.

2. The monitoring device according to claim 1, wherein the authentication processing program is further configured to perform authentication of the monitoring target device using an agreement building process performed by a plurality of monitoring devices other than the monitoring device in the distributed ledger system.

3. The monitoring device according to claim 1, wherein, when a hash value inquiry of the circuit information is received from the monitoring target device, the circuit information distribution program is configured to transmit a hash value of the circuit information registered in advance in the distributed ledger system.

4. The monitoring device according to claim 1, wherein:
the response value is one of a plurality of response values;
the challenge value is one of a plurality of challenge values; and
the executable instructions, when executed by the processor, cause the monitoring device to further function as
an input and output correspondence information registration program configured to transmit the plurality of challenge values to the monitoring target device, receive the plurality of response values corresponding to the plurality of challenge values from the monitoring target device, create the input and output correspondence information of the PUF circuit programmed in the monitoring target device, and register the input and output correspondence information which has been created in the distributed ledger system.

5. The monitoring device according to claim 1, wherein the executable instructions, when executed by the processor, cause the monitoring device to further function as
a mutual authentication program configured to perform mutual authentication with the monitoring target device based on a common key registered in advance in the monitoring device.

6. A monitoring system comprising:
a plurality of monitoring devices according to claim 1, the plurality of monitoring devices being communicatively connected to each other and constituting the distributed ledger system.

7. An information processing device comprising:
a processor; and
a non-transitory computer-readable medium having stored thereon executable instructions that, when executed by the processor, cause the information processing device to function as:
a circuit forming program configured to, when a physically unclonable function (PUFF) circuit is not programmed, request circuit information from a monitoring device, and program the PUF circuit based on the circuit information received from the monitoring device;

a device authentication request program configured to, when the PUF circuit is programmed, make an authentication request the monitoring device to perform authentication, wherein the device authentication request unit is configured to input a challenge value received from the monitoring device into the PUF circuit in response to the authentication request, and reply with a response value, which is an output result of the PUF circuit to the monitoring device; and an encryption processing program configured to: (i) encrypt a control program for formally operating as one constituent device of an embedded system including the information processing device; and (ii) record the control program in the information processing device.

8. The information processing device according to claim 7, wherein the executable instructions, when executed by the processor, cause the information processing device to further function as
a decrypting processing program configured to decrypt the control program encrypted in advance when the monitoring device has performed the authentication of the authentication request.

9. The information processing device according to claim 8, wherein the device authentication request program is configured to remove the control program when the monitoring device cannot perform the authentication of the authentication request.

10. A monitoring method in which a monitoring target device is monitored using a monitoring device, the monitoring method comprising:
distributing circuit information for programming a physically unclonable function (PUF) circuit to the monitoring target device, the circuit information being registered in advance in a distributed ledger system including the monitoring device and at least one additional monitoring device;
transmitting a challenge value to the monitoring target device to which the circuit information is distributed;
receiving a response value corresponding to the challenge value of the PUF circuit programmed in the monitoring target device;
authenticating the monitoring target device based on (i) input and output correspondence information of the PUF circuit programmed in the monitoring target device, the input and output correspondence information being registered in advance in the distributed ledger system, and (ii) the response value which has been received; and
encrypting, by an encryption processing program of the monitoring target device, a control program for formally operating as one constituent device of an embedded system including the monitoring target device, and recording the control program in the monitoring target device.

11. A non-transitory computer readable medium having stored thereon executable instructions that, when executed by a processor of a monitoring device configured to monitor a monitoring target device, cause the monitoring device to:
distribute circuit information for programming a physically unclonable function (PUF) circuit to the monitoring target device, the circuit information being registered in advance in a distributed ledger system including the monitoring device and at least one additional monitoring device;

transmit a challenge value to the monitoring target device to which the circuit information is distributed;

receive a response value corresponding to the challenge value of the PUF circuit programmed in the monitoring target device;

authenticate the monitoring target device based on (i) input and output correspondence information of the PUF circuit programmed in the monitoring target device, the input and output correspondence information being registered in advance in the distributed ledger system, and (ii) the response value which has been received; and encrypt, by an encryption processing program of the monitoring target device, a control program for formally operating as one constituent device of an embedded system including the monitoring target device, and record the control program in the monitoring target device.

* * * * *